US 12,290,867 B2
United States Patent
Aoki

(10) Patent No.: US 12,290,867 B2
(45) Date of Patent: May 6, 2025

(54) POWER TOOL

(71) Applicant: MAKITA CORPORATION, Anjo (JP)

(72) Inventor: Yonosuke Aoki, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 18/101,245

(22) Filed: Jan. 25, 2023

(65) Prior Publication Data
US 2023/0173599 A1 Jun. 8, 2023

Related U.S. Application Data

(62) Division of application No. 16/953,796, filed on Nov. 20, 2020, now Pat. No. 11,590,593.

(30) Foreign Application Priority Data

Nov. 28, 2019 (JP) .................................. 2019-215842
Nov. 28, 2019 (JP) .................................. 2019-215843
(Continued)

(51) Int. Cl.
B23D 61/00 (2006.01)
B24B 23/04 (2006.01)
B26D 1/00 (2006.01)

(52) U.S. Cl.
CPC ............ B23D 61/006 (2013.01); B24B 23/04 (2013.01); *B26D 2001/004* (2013.01); *B26D 2001/006* (2013.01)

(58) Field of Classification Search
CPC ........ B26D 2001/006; B26D 2001/004; B26D 61/006; B24B 23/04
See application file for complete search history.

(56) References Cited

U.S. PATENT DOCUMENTS 3,233,908 A 2/1966 Walter et al.
3,622,170 A 11/1971 Sedgwick
(Continued)

FOREIGN PATENT DOCUMENTS

DE 29605728 U1 9/1996
DE 102005047400 12/2006
(Continued)

OTHER PUBLICATIONS

Office Action from the Japanese Patent Office dispatched Jun. 27, 2023 in related Japanese application No. 2019-215844, and machine translation thereof.
(Continued)

*Primary Examiner* — Liang Dong
(74) *Attorney, Agent, or Firm* — J-TEK LAW PLLC; Jeffrey D. Tekanic; Scott T. Wakeman

(57) ABSTRACT

A power tool includes a spindle, a motor, an inner housing and an outer housing elastically connected to the inner housing. The inner housing is formed by a first inner housing portion formed of metal connected to a second inner housing portion formed of synthetic polymer. The first inner housing portion includes a housing part disposed in a front part of the outer housing, and a first extending part extending rearward from the housing part and disposed in a grip part of the outer housing. The second inner housing portion includes a second extending part that has a tubular shape and at least partially surrounds the first extending part, and a rear end part connected to the second extending part and disposed in a rear part of the outer housing. The first extending part extends rearward of a center of the second extending part in the front-rear direction.

20 Claims, 17 Drawing Sheets

(30) Foreign Application Priority Data

| Nov. 28, 2019 | (JP) | 2019-215844 |
|---|---|---|
| Jul. 13, 2020 | (JP) | 2020-120254 |
| Jul. 13, 2020 | (JP) | 2020-120255 |
| Jul. 13, 2020 | (JP) | 2020-120256 |

(56) References Cited

U.S. PATENT DOCUMENTS

| | | |
|---|---|---|
| 3,998,467 A | 12/1976 | Petkovich |
| 4,205,572 A | 6/1980 | Weiner |
| 4,237,659 A | 12/1980 | Welsch et al. |
| 4,597,227 A | 7/1986 | Gentischer et al. |
| 4,747,607 A | 5/1988 | Emter |
| 4,989,374 A | 2/1991 | Rudolf et al. |
| 5,031,361 A | 7/1991 | MacKay, Jr. |
| 5,157,873 A | 10/1992 | Rudolf et al. |
| 5,263,283 A | 11/1993 | Rudolf et al. |
| 5,423,358 A | 6/1995 | Rautio |
| 5,468,176 A | 11/1995 | Udert et al. |
| 5,573,255 A | 11/1996 | Salpaka |
| 5,575,071 A | 11/1996 | Phillips et al. |
| 5,601,483 A | 2/1997 | Rudolf et al. |
| 5,639,273 A | 6/1997 | Sjolander et al. |
| 5,658,193 A | 8/1997 | McCambridge |
| 5,727,994 A | 3/1998 | Sjolander et al. |
| 5,759,093 A | 6/1998 | Rodriguez |
| 5,919,085 A | 7/1999 | Izumisawa |
| 5,946,810 A | 9/1999 | Hoelderlin et al. |
| 6,142,858 A | 11/2000 | Luedeke |
| 6,244,943 B1 | 6/2001 | Böhler et al. |
| 6,569,001 B2 | 5/2003 | Rudolf et al. |
| 6,612,039 B2 | 9/2003 | Kakiuchi et al. |
| 6,623,202 B2 | 9/2003 | Hansson et al. |
| 6,735,876 B2 | 5/2004 | Hirabayashi |
| 6,796,888 B2 | 9/2004 | Jasch |
| 6,860,792 B2 | 3/2005 | Krondorfer et al. |
| 6,887,142 B2 | 5/2005 | Rupprecht et al. |
| 6,910,694 B2 | 6/2005 | Hartmann et al. |
| 7,344,435 B2 | 3/2008 | Pollak et al. |
| 7,497,860 B2 | 3/2009 | Carusillo et al. |
| 7,537,065 B2 | 5/2009 | Gallagher et al. |
| 7,719,146 B2 | 5/2010 | Takahashi et al. |
| 7,789,737 B2 | 9/2010 | Liersch |
| 7,997,586 B2 | 8/2011 | Ziegler et al. |
| 8,042,437 B2 | 10/2011 | Maier et al. |
| 8,113,520 B2 | 2/2012 | Zaiser et al. |
| 8,181,973 B2 | 5/2012 | Dezheng et al. |
| 8,182,316 B2 | 5/2012 | Peisert |
| 8,187,058 B2 | 5/2012 | Blickle et al. |
| 8,272,135 B2 | 9/2012 | Zhou |
| 8,317,574 B2 | 11/2012 | Blickle et al. |
| 8,641,049 B2 | 2/2014 | Marini et al. |
| 8,851,960 B2 | 10/2014 | Ikuta |
| 8,895,880 B2 | 11/2014 | Mizutani et al. |
| 9,073,563 B2 | 7/2015 | Middleton et al. |
| 9,108,255 B2 | 8/2015 | Li |
| 9,120,216 B2 | 9/2015 | Zhang et al. |
| 9,221,156 B2 | 12/2015 | Bachman et al. |
| 9,555,554 B2 | 1/2017 | Thorson et al. |
| 9,737,969 B2 | 8/2017 | Bek et al. |
| 10,213,852 B2 | 2/2019 | Qian et al. |
| 2001/0023538 A1 | 9/2001 | Muraguchi et al. |
| 2002/0035882 A1 | 3/2002 | Hartmann |
| 2002/0070037 A1 | 6/2002 | Jasch |
| 2002/0170408 A1 | 11/2002 | Hartmann et al. |
| 2002/0175573 A1 | 11/2002 | Hayashi |
| 2003/0100251 A1 | 5/2003 | Besch |
| 2005/0075059 A1 | 4/2005 | Kausch et al. |
| 2005/0095966 A1 | 5/2005 | Jasch et al. |
| 2005/0156390 A1 | 7/2005 | Marini et al. |
| 2006/0172669 A1 | 8/2006 | Hesse et al. |
| 2007/0060030 A1 | 3/2007 | Pollak et al. |
| 2007/0082590 A1 | 4/2007 | Kraenzler et al. |
| 2007/0295156 A1 | 12/2007 | Ziegler et al. |
| 2009/0023371 A1 | 1/2009 | Blickle et al. |
| 2009/0273146 A1 | 11/2009 | Dezheng et al. |
| 2010/0197208 A1 | 8/2010 | Blickle et al. |
| 2010/0236806 A1 | 9/2010 | Heilig et al. |
| 2011/0074122 A1 | 3/2011 | Marini et al. |
| 2011/0086582 A1 | 4/2011 | Takemura et al. |
| 2011/0171887 A1* | 7/2011 | Tanimoto .............. H02K 5/207 |
| | | 310/50 |
| 2011/0316241 A1 | 12/2011 | Zhang et al. |
| 2011/0316242 A1 | 12/2011 | Zhang et al. |
| 2012/0067607 A1 | 3/2012 | Weber et al. |
| 2012/0139196 A1 | 6/2012 | Zhou |
| 2012/0169018 A1 | 7/2012 | Lu et al. |
| 2013/0047762 A1 | 2/2013 | Hecht et al. |
| 2013/0193653 A1 | 8/2013 | Marini et al. |
| 2014/0084552 A1 | 3/2014 | Zieger et al. |
| 2014/0191481 A1 | 7/2014 | Kawakami et al. |
| 2014/0290072 A1 | 10/2014 | Brown et al. |
| 2015/0042052 A1 | 2/2015 | Furusawa et al. |
| 2016/0184956 A1 | 6/2016 | Klabunde et al. |
| 2016/0199919 A1 | 7/2016 | Klabunde et al. |
| 2016/0221175 A1 | 8/2016 | Aoki |
| 2016/0271711 A1 | 9/2016 | Qian et al. |
| 2016/0288288 A1 | 10/2016 | Klabunde et al. |
| 2017/0008160 A1 | 1/2017 | Simma |
| 2017/0050291 A1 | 2/2017 | Aoki |
| 2017/0080545 A1 | 3/2017 | Furusawa et al. |
| 2017/0129123 A1 | 5/2017 | Thorson et al. |
| 2017/0239802 A1 | 8/2017 | Aoki |
| 2017/0239803 A1 | 8/2017 | Aoki |
| 2017/0259348 A1 | 9/2017 | Scott et al. |
| 2018/0243894 A1 | 8/2018 | Wang et al. |
| 2018/0283508 A1* | 10/2018 | Aoki .................. B25F 5/02 |
| 2018/0319001 A1 | 11/2018 | Zhong et al. |
| 2019/0030616 A1 | 1/2019 | Hess et al. |
| 2019/0168372 A1* | 6/2019 | Aoki .................. B25F 3/00 |
| 2019/0299387 A1 | 10/2019 | Kotsuji et al. |
| 2021/0162525 A1 | 6/2021 | Aoki |
| 2021/0362289 A1 | 11/2021 | Nakayama et al. |

FOREIGN PATENT DOCUMENTS

| | | |
|---|---|---|
| DE | 102005031802 A1 | 1/2007 |
| DE | 202010014781 U1 | 12/2010 |
| DE | 102011005021 A1 | 9/2012 |
| DE | 102011005818 A1 | 9/2012 |
| EP | 1790434 A1 | 5/2007 |
| EP | 1790434 B1 | 3/2008 |
| EP | 1737616 B1 | 12/2011 |
| JP | S61029100 U | 2/1986 |
| JP | 08309677 A * | 11/1996 |
| JP | 2000175847 A | 6/2000 |
| JP | 2001239078 A | 9/2001 |
| JP | 2002354745 A | 12/2002 |
| JP | 2016144862 A | 8/2016 |
| JP | 2016529118 A | 9/2016 |
| JP | 2017039180 A | 2/2017 |
| JP | 2017144537 A | 8/2017 |
| JP | 2017144538 A | 8/2017 |
| JP | 2017144539 A | 8/2017 |
| JP | 2019098464 A | 6/2019 |
| WO | 2012007203 A1 | 1/2012 |
| WO | 2016121448 A1 | 8/2016 |
| WO | 2020054616 A1 | 3/2020 |

OTHER PUBLICATIONS

Unpublished U.S. Appl. No. 16/953,733.

Office Action from the United States Patent Office mailed Mar. 26, 2024, in related U.S. Appl. No. 18/135,508, including examined claims 21-40.

Office Action and Search Report from the Japanese Patent Office dispatched Jan. 9, 2024 in counterpart application No. JP 2020-120254, and machine translation thereof.

Office Action and Search Report from the Japanese Patent Office dispatched Jan. 9, 2024 in counterpart application No. JP 2020-120255, and machine translation thereof.

(56) References Cited

OTHER PUBLICATIONS

Office Action and Search Report from the Japanese Patent Office dispatched Jan. 9, 2024 in counterpart application No. JP 2020-120256, and machine translation thereof.

* cited by examiner

POWER TOOL

CROSS-REFERENCE TO RELATED APPLICATIONS

The present application is a divisional application of U.S. patent application Ser. No. 16/953,796, now U.S. Pat. No. 11,590,593, which claims priority to Japanese patent application Nos. 2019-215842, 2019-215843 and 2019-215844, all of which were filed on Nov. 28, 2019. The present application also claims priority to Japanese patent application Nos. 2020-120254, 2020-120255 and 2020-120256, all of which were filed on Jul. 13, 2020. The contents of all of the foregoing applications are hereby fully incorporated herein by reference.

TECHNICAL FIELD

The present disclosure relates to a power tool that is configured to drive (pivot) a tool accessory in an oscillating manner.

BACKGROUND

Known power tools (e.g. oscillating multi-tools, which are also known in the power tool field as "multi-tools") are configured to perform an operation, such as cutting, sanding, scraping, etc., on a workpiece by transmitting a rotary output of a motor to a spindle and thereby pivotally oscillating a tool accessory that is mounted to (on) a lower axial end portion of the spindle. In some of these known oscillating multi-tools, for the purpose of isolating vibration, an inner housing that houses a motor and a driving mechanism is elastically connected with an outer housing, which is designed to be held by a user, in a manner that permits relative movement therebetween.

SUMMARY

In one aspect of the present disclosure, a power tool is configured to drive (pivot) a tool accessory in an oscillating manner. The power tool may include e.g., a spindle, a motor, an elongate inner housing and an elongate outer housing. The spindle is supported to be rotatable (pivotable) around a first axis that defines or is in parallel to an up-down direction of the power tool. A tool mounting part or tool mounting surface is defined at a lower end portion of the spindle. The motor has an output shaft that is configured to rotate around a second axis that extends in parallel to the first axis to pivotally oscillate the spindle. The inner housing has a longitudinal axis that is orthogonal to the first and second axes and that defines or is in parallel to a front-rear direction of the power tool. The outer housing houses (at least partially surrounds, at least substantially surrounds, or entirely surrounds) the inner housing. The outer housing also has a longitudinal axis that extends in the front-rear direction and is elastically connected to the inner housing, e.g., via one or more elastomeric structures or cushions. The outer housing includes a front part, a rear part and a grip part, which are preferably formed in an integral manner (i.e. without a seam therebetween). The grip part connects the front part and the rear part and is configured to be held (grasped) by a user. The inner housing includes a front part disposed within the front part of the outer housing, and an extending part connected to the front part of the inner housing and extending rearward within (through) the grip part of the outer housing. The extending part is at least substantially immovable relative (e.g., rigidly affixed) to the front part of the inner housing. The inner housing is formed by (comprises) a first inner housing portion formed (preferably entirely formed) of metal (e.g., a metal alloy) that is connected, preferably fixedly or immovably connected, to a second inner housing portion formed (preferably entirely formed) of synthetic resin/polymer, i.e. a plastic material. The first inner housing includes a housing part and a first extending part. The housing part houses at least the spindle and forms at least a portion of the front part of the inner housing. The first extending part extends rearward from the housing part and forms a portion of the extending part. The second inner housing includes a second extending part that forms another portion of the extending part. The first extending part extends rearward of a center of the second extending part in the front-rear direction.

In such a power tool, the inner housing is elongated to increase the moment of inertia of the inner housing around the first axis, thereby reducing unnecessary movement of the inner housing relative to the outer housing and thus deterioration in working efficiency of the tool accessory. Further, the first extending part, which is formed of metal extends rearward of the center of the second extending part, which is formed of synthetic resin/polymer. Therefore, the first extending part can function like a core bar (reinforcing rod or support beam) for the second extending part and thereby reduce the possibility that the second extending part will act like a spring element (e.g., in case the plastic material softens in a high temperature and/or high humidity environment) and thus reduce the vibration isolating effect.

DETAILED DESCRIPTION OF THE EMBODIMENTS

An oscillating multi-tool 1 according to a non-limiting, representative embodiment is now explained with reference to the Figures. The oscillating multi-tool 1 shown in the Figures is an exemplary example of an electric power tool that is configured to perform an operation, e.g., sawing, cutting, sanding, etc., on a workpiece (not shown) by driving (pivoting) a tool accessory 91 in an oscillating manner within a specified angular range, e.g., that is less than 5°.

Figure 1:
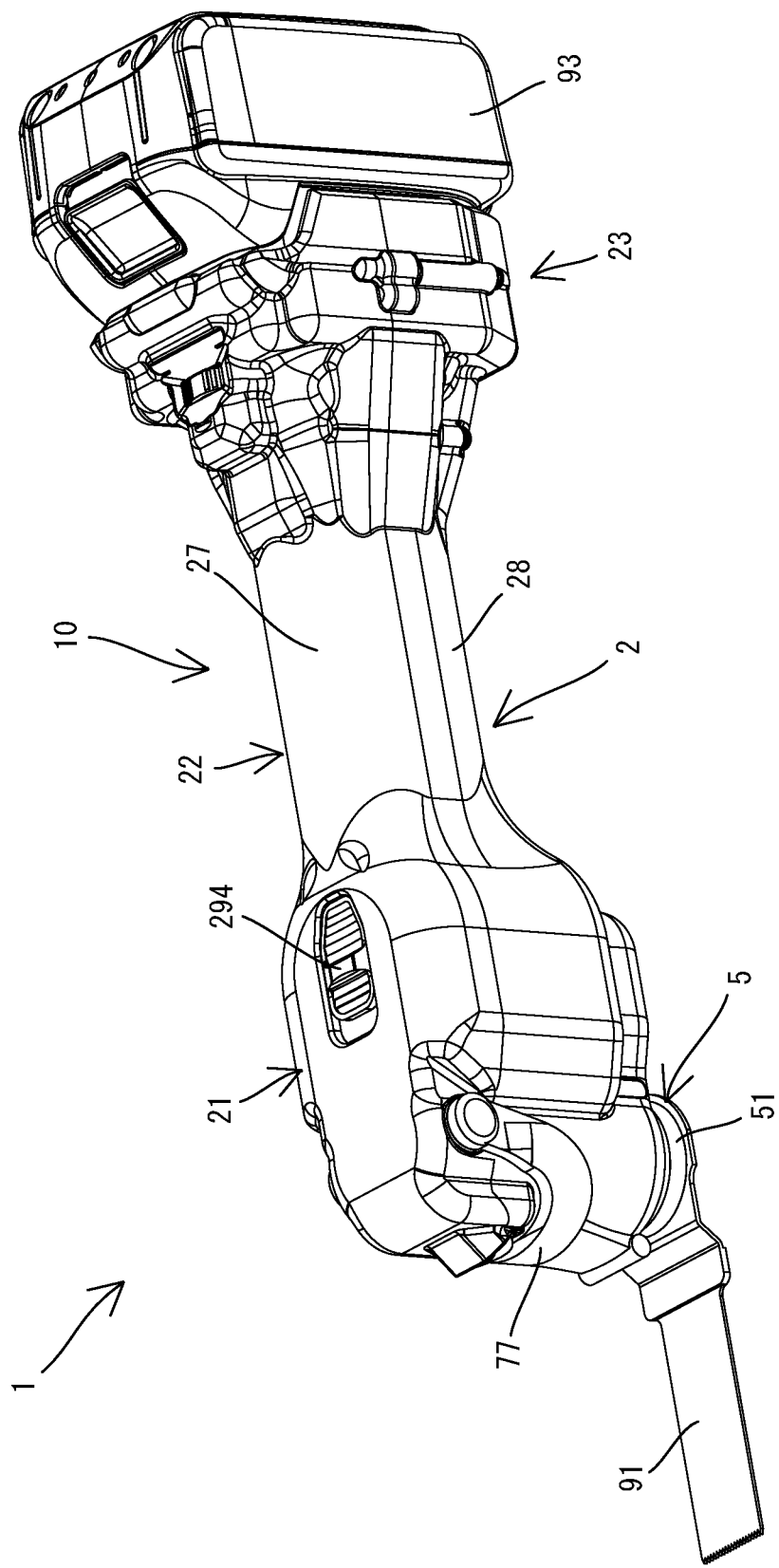
FIG. 1 is a perspective view of a representative, non-limiting oscillating multi-tool (multi-tool) according to one exemplary embodiment of the present teachings.
Figure 2:
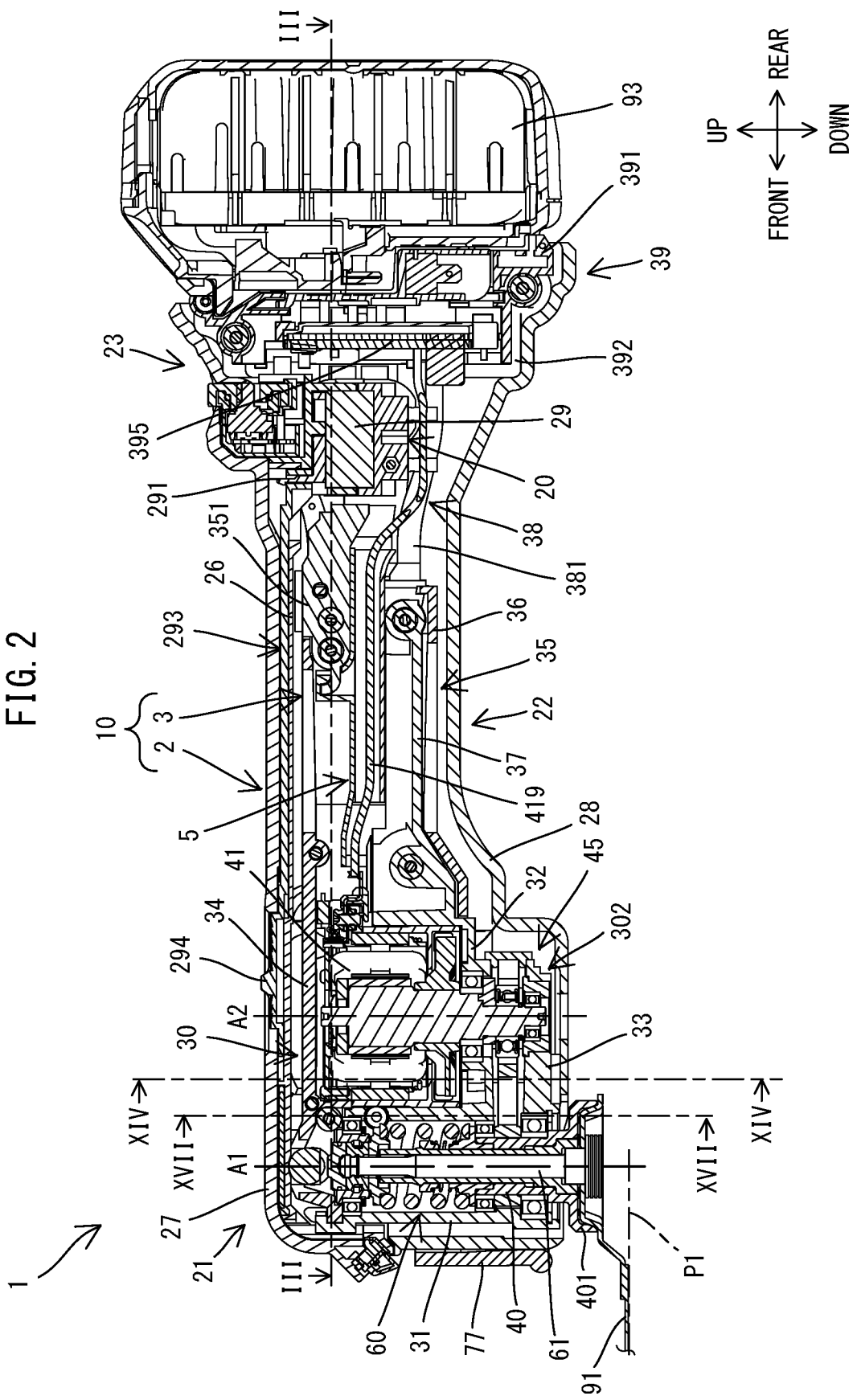
FIG. 2 is a sectional view of the oscillating multi-tool.

First, the general structure of the oscillating multi-tool 1 is briefly described. As shown in FIGS. 1 and 2, the oscillating multi-tool 1 has an elongate housing (also referred to as a tool body) 10. An elongate spindle 40, a motor 41 and a transmitting mechanism 45 are housed in one end portion of the housing 10 in a longitudinal direction of the housing 10. The spindle 40 is arranged such that a longitudinal axis of the spindle 40 at least substantially orthogonally intersects a longitudinal axis of the housing 10. One (lower) axial end portion of the spindle 40 protrudes from the housing 10 and is exposed outside of the housing 10. This lower axial end portion of the spindle 40 forms (defines) a tool mounting part 401, to (on) which the tool accessory 91 is removably mounted. Further, a battery (battery pack, battery cartridge) 93 for supplying electric power to the motor 41 is removably mounted to (on) the other end portion of the housing 10 in the longitudinal direction. In the oscillating multi-tool 1, the spindle 40 is driven about a driving axis A1 with a rotary (pivotal) oscillating motion within a specified angle range, using power generated by the motor 41, and thereby oscillates the tool accessory 91 in an oscillation plane P1.

For the sake of convenience in the following description, the directions of the oscillating multi-tool 1 are related in the following manner. An extension direction of the driving axis A1 is defined as an up-down direction. In the up-down direction, the side on which the tool mounting part 401 of the spindle 40 is located is defined as a lower side of the oscillating multi-tool 1, while the opposite side is defined as an upper side of the oscillating multi-tool 1. A direction that is orthogonal to the driving axis A1 and that corresponds to the longitudinal direction of the housing 10 is defined as a front-rear direction of the oscillating multi-tool 1. In the front-rear direction, the side of one end portion of the housing 10 in which the spindle 40 is housed is defined as a front side of the oscillating multi-tool 1, while the side of the other end portion to (on) which the battery 93 is mounted is defined as a rear side of the oscillating multi-tool 1. Further, a direction that is orthogonal to both the up-down direction and the front-rear direction is defined as a left-right direction.

The structure of the oscillating multi-tool 1 is now described in detail.

First, the structure of the housing 10 is described. The housing 10 of this embodiment is configured as a so-called vibration-isolating housing. More specifically, as shown in FIGS. 1 to 3, the housing 10 includes an elongate outer housing 2, which forms an outer shell of the oscillating multi-tool 1, and an elongate inner housing 3, which is housed in (surrounded by) the outer housing 2 and is elastically connected to the outer housing 2.

Figure 3:
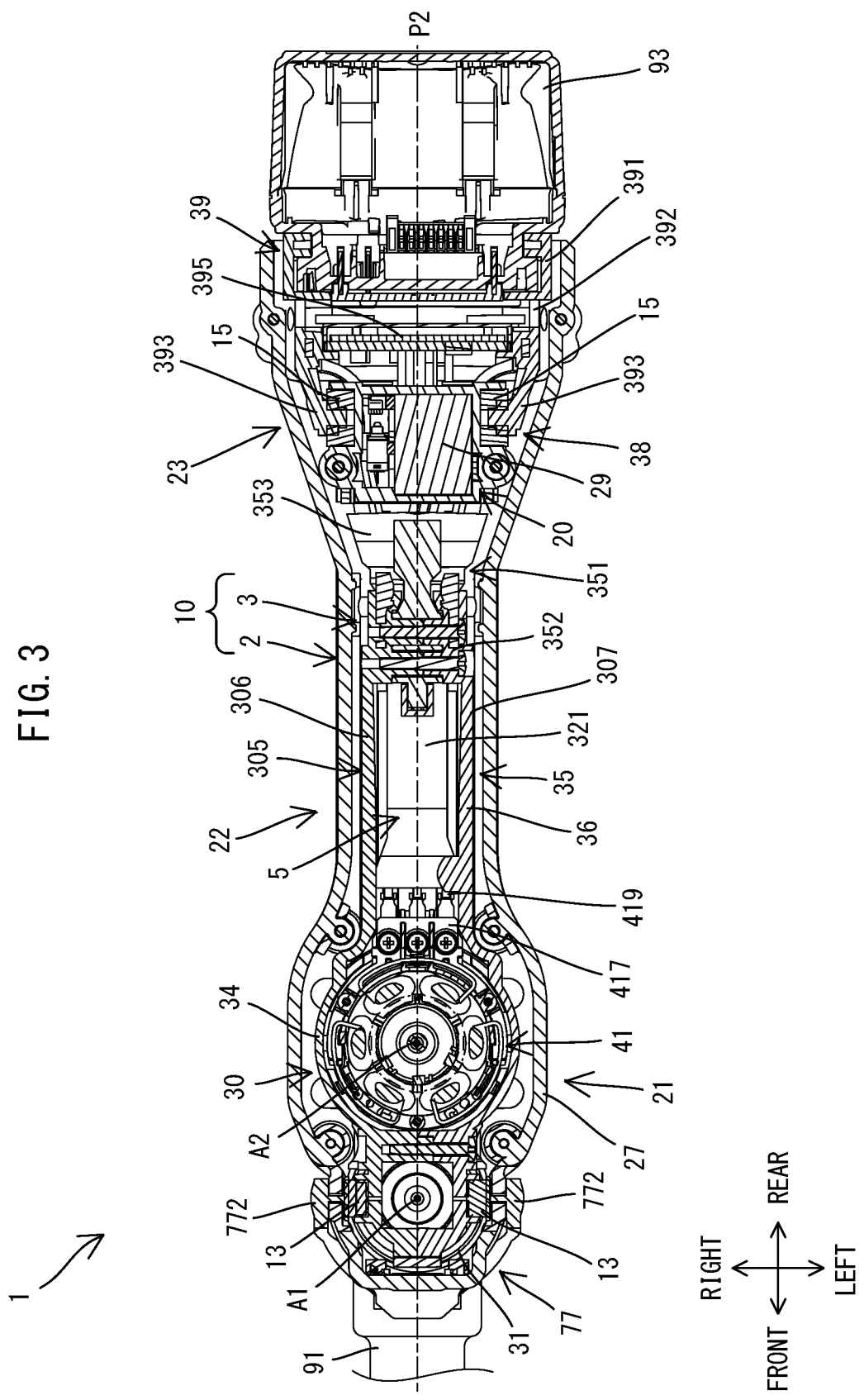
FIG. 3 is a sectional view taken along line III-III in FIG. 2.

As shown in FIGS. 1 to 3, in relation to the front-rear direction, the outer housing 2 includes a front part 21, a rear part 23 and an intermediate part 22 that connects the front part 21 and the rear part 23.

The front part 21 has a generally rectangular box-like shape. A front part 30 of the inner housing 3 is disposed within the front part 21. A lever 77 is rotatably (pivotably) supported by (at) an upper front end portion of the front part 21. The lever 77 is a manually operable member (manipulation member) that is configured to cause a clamping mechanism 60 (see FIG. 6) to clamp (secure, lock) and unclamp (release, unlock) the tool accessory 91. Further, an opening is formed in a rear end portion of an upper wall of the front part 21. A slide operation (manipulation) part 294 is exposed to the outside through this opening, so that a user can manipulate (push) the operation part 294. The operation part (slide switch or switch knob) 294 is a manually operable (slidable) member (manipulation member) for switching ON and OFF the switch 29 for starting the motor 41.

The rear part 23 has a tubular shape having a sectional area increasing toward the rear. An elastic connection part 38 and a rear part 39 of the inner housing 3 are disposed within the rear part 23.

The intermediate part 22 has a tubular shape. The intermediate part 22 linearly extends in the front-rear direction. The intermediate part 22 forms a portion configured to be held by a user. Accordingly, the intermediate part 22 is hereinafter also referred to as a grip part 22. The grip part 22 is narrower (i.e. has a smaller diameter or cross-section) than the front part 21 and the rear part 23 so as to be easy to hold (grasp) with one hand. In other words, the outer circumferential (peripheral) length of a section of the grip part 22 is shorter (less) than the outer circumferential (peripheral) length of each of the front part 21 and the rear part 23.

In this embodiment, the outer housing 2 is formed by an upper shell (upper housing half) 27, a lower shell (lower housing half) 28 and a switch holder 20 that are each formed separately from each other and connected together. Each of the upper shell 27, the lower shell 28 and the switch holder 20 is a member (structure, component) that is integrally molded from synthetic resin/polymer. Although not shown in detail, the outer housing 2 is formed by fitting (mating) the upper shell 27 and the lower shell 28 together in the up-down direction with the switch holder 20 disposed therebetween and connecting them by screws at multiple positions.

As shown in FIGS. 2 to 5, in relation to the front-rear direction, the inner housing 3 includes a front part 30, an extending part 35, an elastic connection part 38 and a rear part 39.

Figure 6:
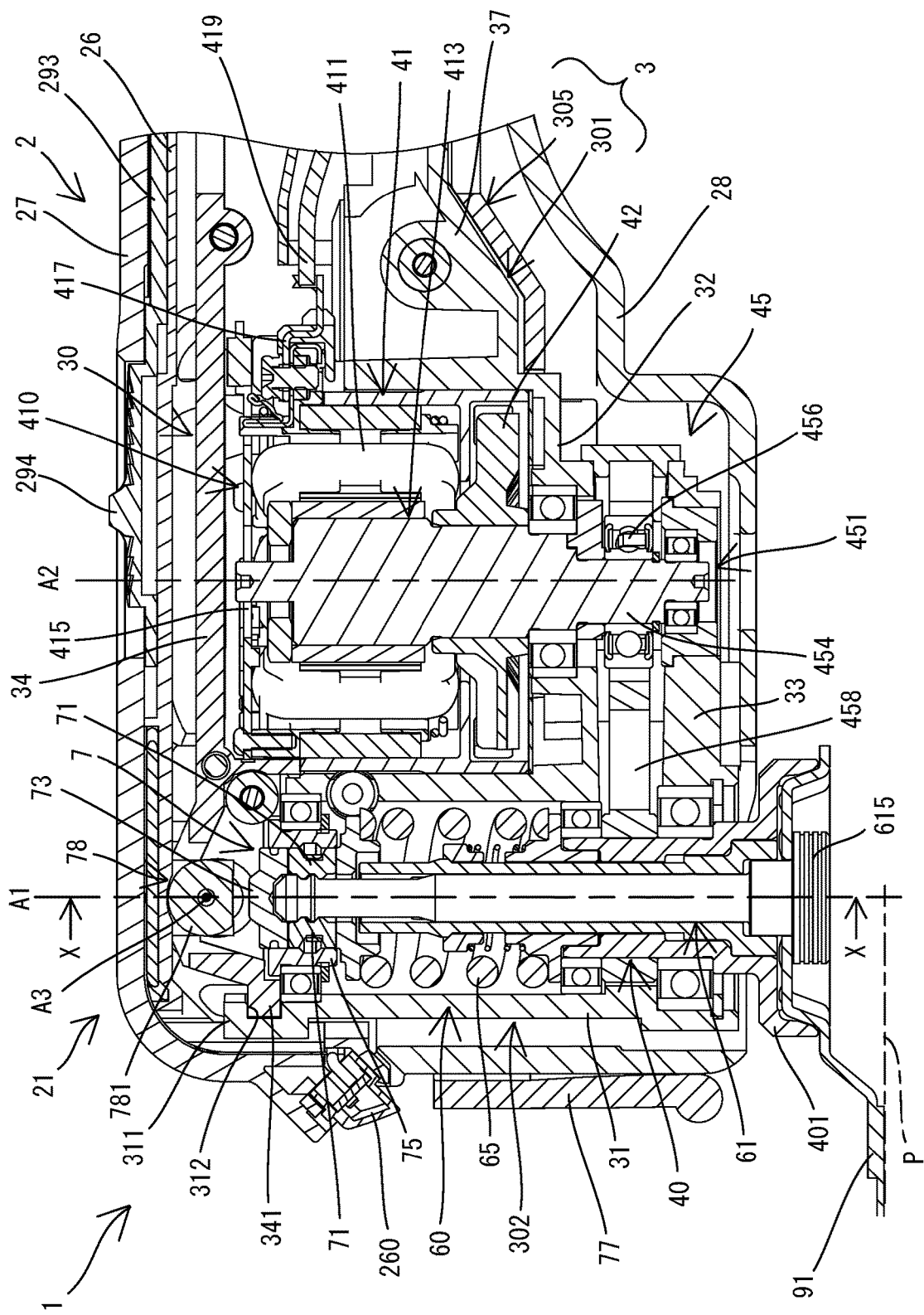
FIG. 6 is a partial, enlarged view of FIG. 2.

As shown in FIG. 6, the front part 30 houses the spindle 40, the motor 41 and the transmitting mechanism 45. More specifically, the front part 30 includes a first housing part 31, a second housing part 32, a third housing part 33 and a cover part 34.

The first housing part 31 houses the spindle 40. The first housing part 31 has a generally hollow circular cylindrical shape and extends in the up-down direction. The second housing part 32 houses the motor 41. The second housing part 32 has a generally hollow circular cylindrical shape having a larger diameter than the first housing part 31. The second housing part 32 is disposed behind the first housing part 31. Further, the second housing part 32 is shorter than the first housing part 31 in the up-down direction. A lower end of the second housing part 32 is located above a lower end of the first housing part 31. The third housing part 33 houses the transmitting mechanism 45. The third housing part 33 is disposed behind the first housing part 31 and under the second housing part 32. The third housing part 33 communicates with the first housing part 31 and the second housing part 32. The cover part 34 covers an open top of the first housing part 31 and an open top of the second housing part 32.

As shown in FIGS. 2 to 5, the extending part 35 extends rearward from a rear end of the front part 30. The extending part 35 corresponds to at least a portion of the grip part 22 of the outer housing 2. In other words, the extending part 35 is partly or entirely housed within at least a portion of the grip part 22. In this embodiment, the length of the extending part 35 in the front-rear direction is approximately equal to the length of the grip part 22 in the front-rear direction. The extending part 35 is thus generally entirely disposed within the grip part 22.

The extending part 35 includes an outer extending part 36 that forms (defines) an outer shell of the extending part 35, and an inner extending part 37 that is disposed within the outer extending part 36. The outer extending part 36 has a generally rectangular hollow cylindrical (tubular) shape and extends rearward from a rear end portion of the front part 30 (more specifically, the second housing part 32). The inner extending part 37 extends within (through) the outer extending part 36 rearward from the rear end portion of the front part 30 (more specifically, from the second housing part 32) to a rear end portion of the outer extending part 36. A rear end of the inner extending part 37 is located slightly forward of a rear end of the outer extending part 36 (rear end of the extending part 35). Thus, the inner extending part 37 corresponds to most of the outer extending part 36 in the front-rear direction. The inner extending part 37 is disposed in a lower portion of the outer extending part 36. In this embodiment, the inner extending part 37 linearly extends on (in) an imaginary plane P2 (see FIG. 3) that passes through a center or approximately (close to) the center of the oscillating multi-tool 1 in the left-right direction and extends in the up-down direction. The plane P2 contains the driving axis A1 and a rotational axis A2 of the motor 41.

The elastic connection part 38 extends rearward from the rear end of the extending part 35 and connects the extending part 35 and the rear part 39 such that the extending part 36 and the rear part 38 are movable relative to each other. More specifically, the elastic connection part 38 includes a plurality of elastic ribs 381 that connect the outer extending part 36 and the rear part 39 in the front-rear direction. In this embodiment, four such elastic ribs 381 are arranged spaced apart from each other around the longitudinal axis of the inner housing 3. The elastic ribs 381 are shaped to be easily deformable and are also formed of a material having a lower elastic modulus than the other (plastic) portions of the inner housing 3 that are formed of the synthetic resin/polymer, such as the outer extending part 36. The elastic ribs 381 can thus reduce (attenuate) transmission of vibration, which is generated in the front part 30 during the operation, to the rear part 39 by elastically absorbing the vibration. The structures embodied by the elastic ribs 381 may alternately be called, e.g., elastic strips, elastic bars (or crossbars), elastic crosspieces, elastic beams, elastic bands, elastic links, etc. The structures embodied by the elastic ribs 381 preferably possess the properties of being compressible, bendable and/or extendable in the longitudinal direction of the oscillating multi-tool 1. In other words, the structures embodied by the elastic ribs 381 have a lower Young's modulus in the longitudinal direction than the other plastic portions of the inner housing 3 or the outer housing 2, which is also made of a synthetic resin/polymer.

The rear part 39 has a generally rectangular box-like shape. The rear part 39 is disposed within the rear part 23 of the outer housing 2 as described above. A gap (clearance) is formed between the rear part 23 and an outer peripheral surface of the rear part 39. This gap serves as an inlet (port) for leading (drawing) air (cooling air) for cooling the motor 41 and a control unit 395 into the outer housing 2.

Figure 4:
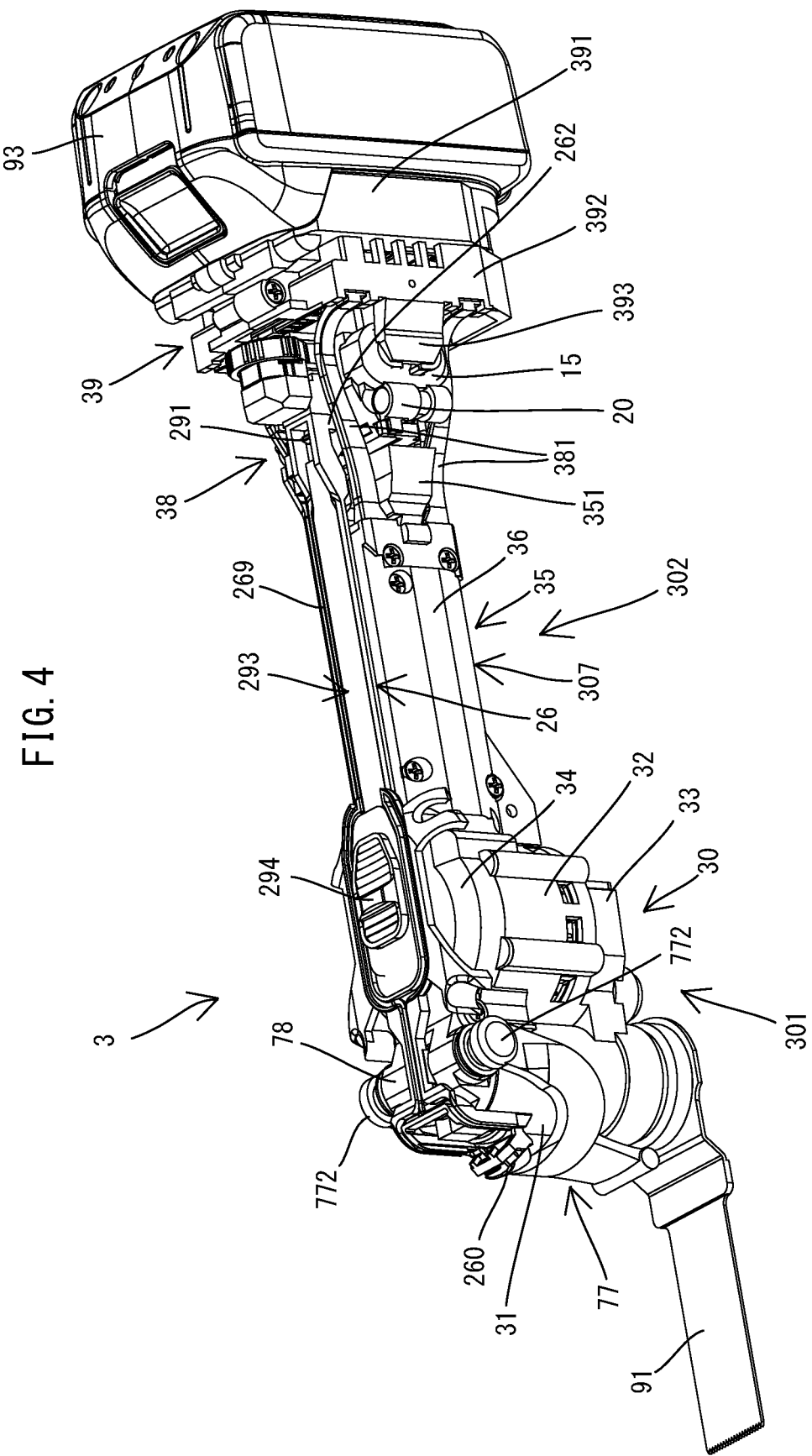
FIG. 4 is a perspective view of the oscillating multi-tool as viewed from above with an outer housing removed therefrom.
Figure 5:
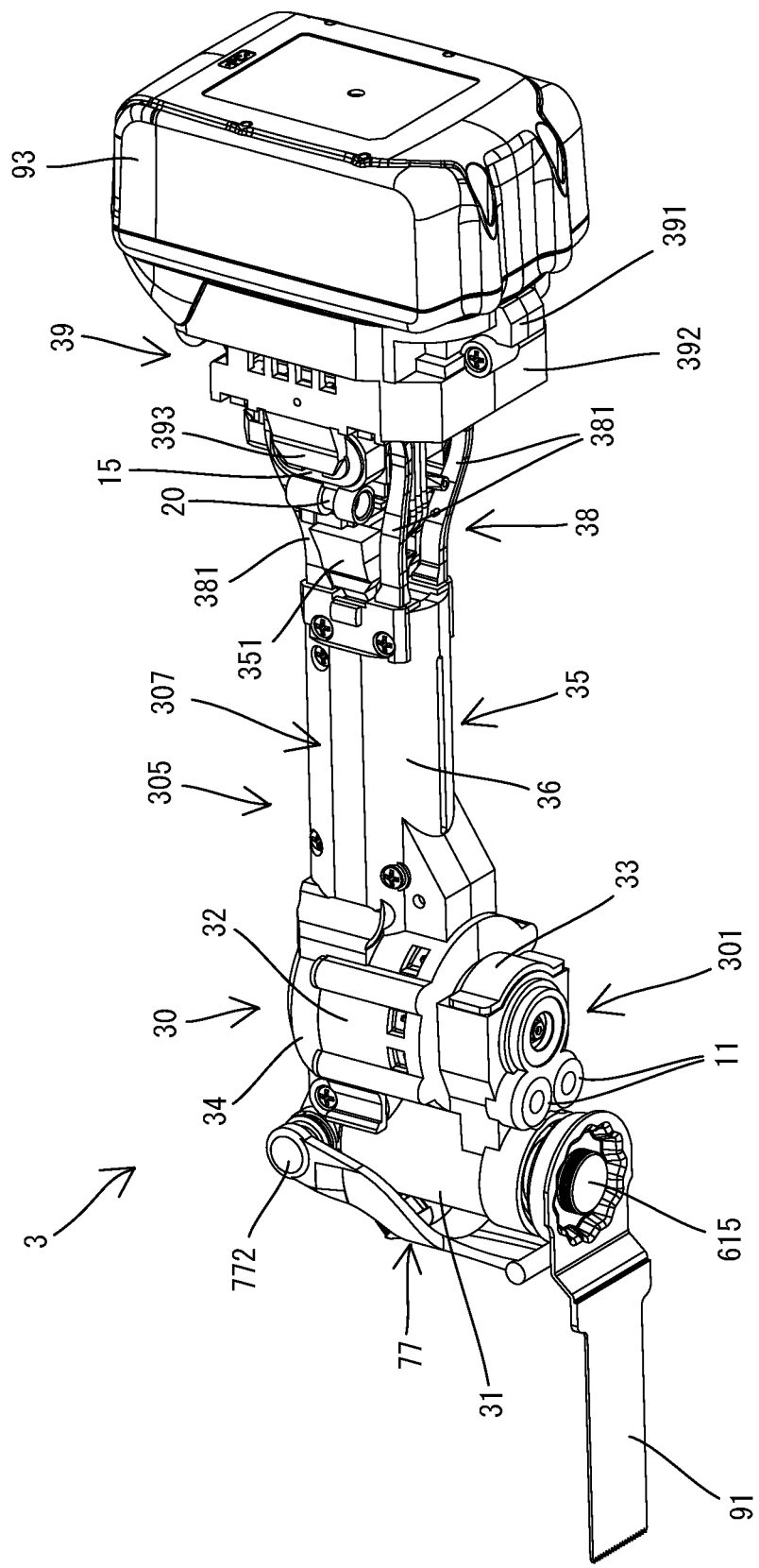
FIG. 5 is a perspective view of the oscillating multi-tool as viewed from below with the outer housing removed therefrom.

As shown in FIGS. 4 and 5, the inner housing 3 is formed by (comprises) a metal housing 301 and a plastic housing 305 that are formed separately from each other and are connected together.

Figure 8:
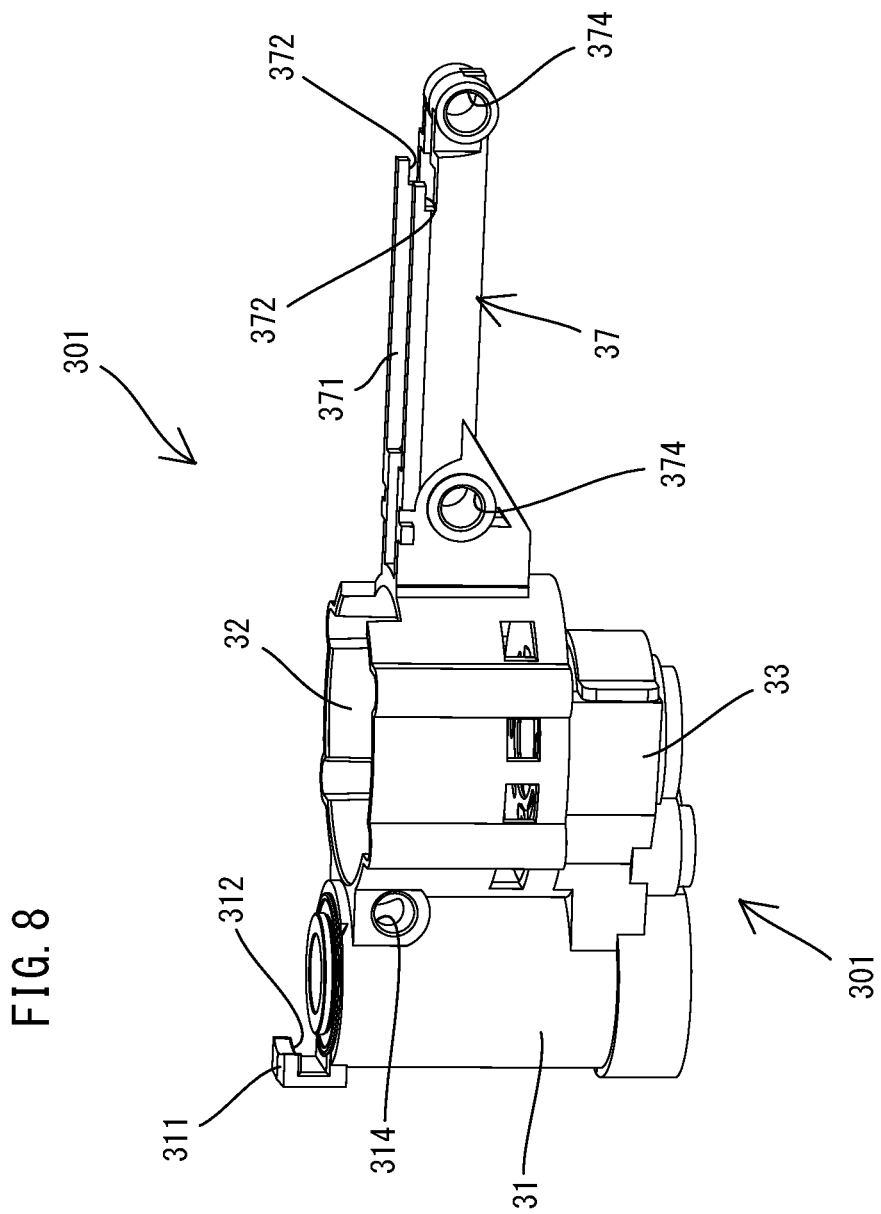
FIG. 8 is a perspective view of a metal housing.
Figure 9:
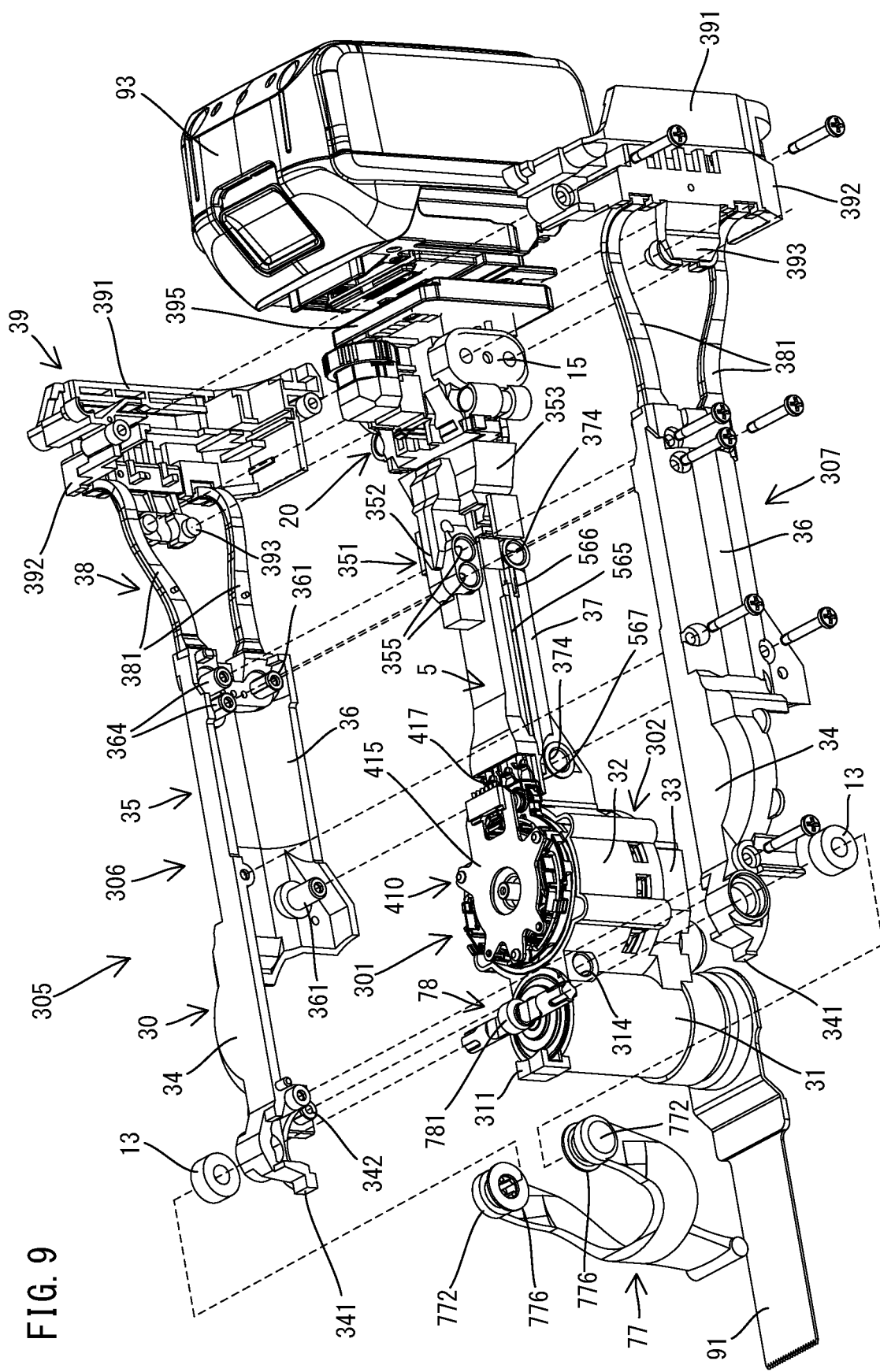
FIG. 9 is an exploded perspective view of the oscillating multi-tool (excluding the outer housing).

The metal housing 301 is a single (integral) metal member (structure, component), i.e. there are no seams between the various portions thereof and may be a cast metal part or a machined metal part. As shown in FIGS. 6, 8 and 9, a front portion of the metal housing 301 is formed as a housing part 302 that houses a drive part (e.g., the motor 41, the transmitting mechanism 45, the spindle 40, etc.) that is configured to pivotally oscillate the tool accessory 91. The housing part 302 includes the first housing part 31, the second housing part 32 and the third housing part 33 described above. A rear portion of the metal housing 301 is formed by the inner extending part 37. Thus, the metal housing 301 forms (defines) a portion of the front part 30 and a portion of the extending part 35.

As shown in FIG. 9, the plastic housing 305 is formed by a right shell (right housing half) 306 and a left shell (left housing half) 307 that are formed separately from each other and are connected together. The right shell 306 and the left shell 307 are each formed of synthetic resin/polymer. The plastic housing 305 includes the cover part 34, the outer extending part 36, the elastic connection part 38 and the rear part 39 described above. Thus, the plastic housing 305 forms (defines) a portion of the front part 30, a portion of the extending part 35, the elastic connection part 38 and the rear part 39. In this embodiment, the right shell 306 and the left shell 307 are formed to be at least substantially symmetrical (e.g., in plane symmetry relative to the plane P2 (see FIG. 3)), except for portions to be connected by screws.

The inner housing 3 is formed by connecting the right shell 306 and the left shell 307 with the metal housing 301 by screws, in a state in which the inner extending part 37 of the metal housing 301 is held between the right shell 306 and the left shell 307 (specifically, portions of the right shell 306 and the left shell 307 forming the outer extending part 36) from the right and left.

Assembly of the housing 10 and the structures that elastically connect the outer housing 2 and the inner housing 3 will be described in detail below.

The structures (elements) disposed within the inner housing 3 are now described.

First, the structures (elements) disposed within the front part 30 are described. As shown in FIG. 6, the front part 301 mainly houses the spindle 40, the motor 41, the transmitting mechanism 45 and a clamping mechanism 60.

First, the spindle 40 is described. The spindle 40 is an elongate hollow member having a generally hollow circular cylindrical shape. In this embodiment, the spindle 40 is supported by two bearings to be rotatable (pivotable) around the driving axis A1. The two bearings are held by (in) the first housing part 31. As described above, the lower end portion of the spindle 40 is configured as the tool mounting part 401, which is configured to removably receive (contact, support) the tool accessory 91.

The motor 41 is now described. The motor 41 is a brushless DC motor. The motor 41 has a stator 411, a rotor disposed radially inside the stator, and an output shaft (rotary shaft) 413 that is configured to rotate together with the rotor. In this embodiment, the rotor and the output shaft 413 are integrally formed with each other as a single member. However, the rotor and the output shaft 413 may be separately formed from each other and connected together. The motor 41 is housed in the second housing part 32 such that the rotational axis A2 of the output shaft 413 extends in parallel, or at least substantially in parallel, to the driving axis A1 (i.e. in the up-down direction). The output shaft 413 protrudes downward of the stator 411. A fan 42 for cooling the motor 41 is fixed around the output shaft 413.

A board (circuit board) 415 having Hall sensors (not shown) mounted thereon is disposed above the stator 411. A terminal block 417 is disposed behind an upper rear end portion of the stator 411. The terminal block 417 has terminals for supplying electric power (currents) to energize (drive) the motor 41. An upper rear end portion (a portion located above the inner extending part 37) of the second housing part 32 has a recess that is recessed downward from an upper end of the upper rear end portion (see FIG. 8). The terminal block 417 protrudes rearward from this recess. In this embodiment, the board 415 and the terminal block 417 are fixed to the stator 411, and form a stator assembly 410 together with the stator 411.

The transmitting mechanism 45 is now described. The transmitting mechanism 45 is a well-known mechanism that is configured to transmit rotary motion of the output shaft 413 to the spindle 40 to cause rotary (pivotal) oscillating motion of the spindle 40 within a specified angle range around the driving axis A1. The transmitting mechanism 45 includes an eccentric shaft 451, a drive bearing 456 and an oscillating arm 458.

The eccentric shaft 451 is coaxially connected to the output shaft 413 of the motor 41 (in FIG. 6, the eccentric shaft 451 is shown integrally with the output shaft 413). The eccentric shaft 451 is rotatably supported by two bearings, which are respectively held in a lower end portion of the second housing part 32 and in a lower end portion of the third housing part 33. The eccentric shaft 451 has an eccentric part (cam) 454 that is eccentric to the rotational axis A2. An inner ring of the drive bearing 456 is fixed around the eccentric part 454. The oscillating arm 458 operably connects the drive bearing 456 and the spindle 40. The oscillating arm 458 extends across the first housing part 31 and the third housing part 33. Although not shown in detail because it is a well-known structure, one end portion of the oscillating arm 458 is annular-shaped and fixed around an outer periphery of the spindle 40 between the two bearings that pivotably support the spindle 40. The other end portion of the oscillating arm 458 is bifurcated (forked) and its two ends are disposed to abut on the left side and the right side, respectively, of an outer peripheral surface of an outer ring of the drive bearing 456.

When the motor 41 is driven, the eccentric shaft 451 rotates together with the output shaft 413, which causes the oscillating arm 458 to oscillate the spindle 40 within the specified angle range about the driving axis A1 of the spindle 40. The spindle 40 is thus driven for rotary (pivotal) oscillating motion within the specified angle range around the driving axis A1 in response to oscillating movement of the oscillating arm 458. As a result, the tool accessory 91 mounted to (on) the spindle 40 oscillates around the driving axis A1 in the oscillation plane P1, which enables a processing operation to be performed on a workpiece using the oscillating tool accessory 91.

Figure 10:
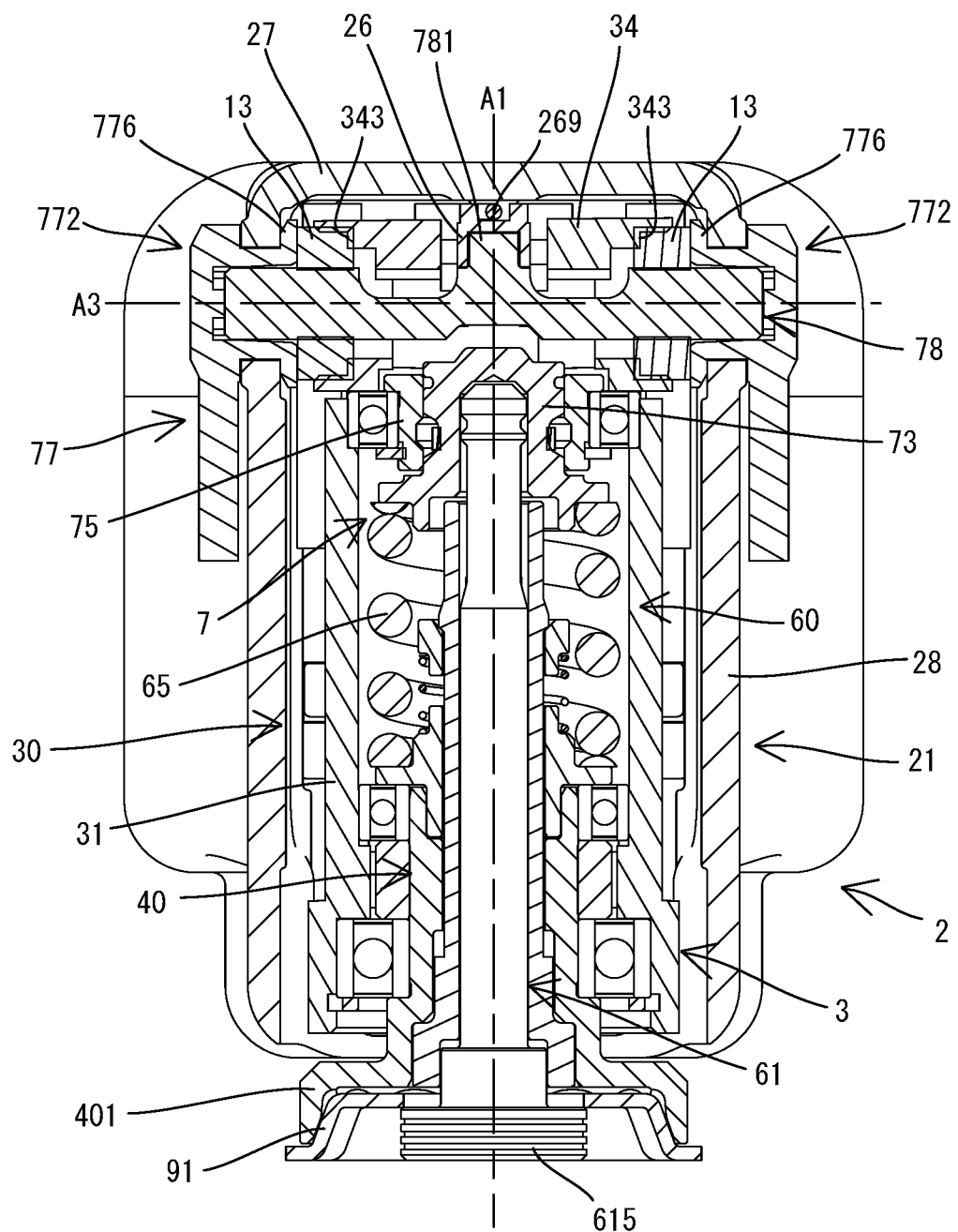
FIG. 10 is a sectional view taken along line X-X in FIG. 6.

The clamping mechanism 60 is now described. The clamping mechanism 60 is configured to secure (fix) the tool accessory 91 to the tool mounting part 401 such that the tool accessory 91 rotates (pivots) together with the spindle 40. As shown in FIGS. 6 and 10, in this embodiment, the clamping mechanism 60 includes a clamp shaft (clamping shaft, holding bolt) 61, a clamp spring 65 and a lock mechanism (latching mechanism) 7.

The clamp shaft 61 is an elongate member having a generally rod-like shape. The clamp shaft 61 is removably inserted through (into) the spindle 40 to be coaxial with the spindle 40. The clamp shaft 61 has a flange-like clamp head 615 on its lower end.

The clamp spring 65 is a biasing member that biases the clamp shaft 61 upward relative to the spindle 40 and thereby applies to the clamp shaft 61 a clamping force for clamping the tool accessory 91. In this embodiment, the clamp spring 65 is configured to bias the clamp shaft 61 upward via the lock mechanism 7.

The lock mechanism 7 is configured to hold (lock) the clamp shaft 61 in (at) a clamp position (or clamping position) (shown in FIGS. 6 and 10), in which the clamp shaft 61 and the tool mounting part 51 are capable of clamping the tool accessory 91. The lock mechanism 7 is disposed above the spindle 40 within the first housing part 31. In this embodiment, the lock mechanism 7 includes a pair of clamp members (clamping members or chuck jaws) 71, a holder 73 and a collar 75.

The clamp members 71 are arranged to face each other across the driving axis A1. Each of the clamp members 71 is configured to engage with a groove part formed in an upper end portion of the clamp shaft 61. The holder 73 holds the clamp members 71 such that the clamp members 71 are movable in the radial direction relative to the driving axis A1 (i.e. in the direction that is perpendicular to the driving axis A1). Although not shown in detail, each of the clamp members 71 is movable in the radial direction of the clamp shaft 61 between an engagement position in (at) which the clamp members 71 are engageable with the upper end portion of the clamp shaft 61, such that the clamp members 71 strongly hold (engage) the clamp shaft 61, and a disengagement position in (at) which the clamp members 71 are not engageable with the upper end portion of the clamp shaft 61, such that the clamp members 71 are incapable of holding (engaging) or only weakly hold the clamp shaft 61. The clamp members 71 are always biased radially inward toward their respective engagement positions, e.g., by an elastic ring that surrounds the clamp members 71. The elastic ring may be made of an elastomer or an elastic metal, such as a garter spring.

The collar 75 is a hollow circular cylindrical member. The collar 75 is held in the inner housing 3 so as to be immovable in the up-down direction relative to the inner housing 3 and to be rotatable around the driving axis A1. The collar 75 holds the holder 73 and the clamp members 71 such that the holder 73 and the clamp members 71 are movable relative to the collar 75 in the up-down direction. In response to a user's manual operation of pivoting (turning) the lever 77 around a rotational axis A3, each of the clamp members 71 moves together with the holder 73 in the up-down direction relative to the collar 75, between a position (hereinafter referred to as a lock position) in (at) which the clamp members 71 are not movable (are blocked from moving) away from the engagement position and a position (hereinafter referred to as an unlock position) in (at) which the clamp members 71 are allowed to move (are movable) in the radial direction of the clamp shaft 61 away from the engagement position to the disengagement position.

Operations for pivoting (turning) the lever 77 and for clamping and unclamping the clamping mechanism 60 are now briefly described.

As shown in FIGS. 9 and 10, an upper portion of the lever 77 is generally U-shaped and the lever 77 is Y-shaped overall with a grip portion connecting the two upper end portions. The lever 77 is a single (integral) member formed of synthetic resin/polymer. The lever 77 is elastically deformable in the direction in which its two upper end portions face each other. The opposing upper end portions (hereinafter referred to as engagement parts 772) of the lever 77 are supported by (in) an upper portion of the front part 21 of the outer housing 2, so that the lever 77 is pivotable (rotatable) around the rotational axis A3 that extends in the left-right direction. The lever 77 is pivotable between a first position (hereinafter referred to as a front position or clamping position, see FIG. 1) in (at) which a central portion of the lever 77 abuts on a front surface of the front part 21, and a second position (hereinafter referred to as an upper position or unclamped position, not shown) in (at) which the central (grip) portion of the lever 77 is located above the front part 21.

The lever 77 is connected to a rotary shaft 78 so as to rotate (pivot) therewith. The rotary shaft 78 is inserted through a through hole that extends through the front part 30 (specifically, the cover part 34) of the inner housing 3 in the left-right direction. The rotary shaft 78 extends in the left-right direction above the lock mechanism 7 (the holder 73). The two end portions of the rotary shaft 78 are respectively connected to the engagement parts 772 of the lever 77, and are supported by the outer housing 2 via the engagement parts 772. The rotary shaft 78 rotates (pivots) together with the lever 77 around the rotational axis A3 in response to manual pivoting (rotation) of the lever 77. An eccentric part (cam part or turn block) 781 is eccentric to the rotational axis A3 and is formed on (at) a central portion of the rotary shaft 78 such that the driving axis A1 intersects the eccentric part 781.

As shown in FIGS. 6 and 10, when the lever 77 is in (at) the front position, a first portion of the eccentric part 781 that has a smaller diameter (small-diameter part) is located spaced apart upward from the holder 73. Therefore, the rotary shaft 78 is not subjected to the biasing force of the clamp spring 65. At this time, the clamp members 71 are held in (pushed to) their respective lock positions relative to the collar 75, and also in their respective engagement positions to forcibly press against and hold the clamp shaft 61. The holder 73, the clamp members 71 and the clamp shaft 61 are biased upward together, and thus the clamp shaft 61 is held in the (at its) uppermost position. Consequently, the clamp head 615 clamps the tool accessory 91 in cooperation with (against) the tool mounting part 401.

In the process of pivoting the lever 77 upward from the front position and placing it in (at) the upper position, a second portion of the eccentric part 781 that has a larger diameter (large-diameter part) comes into contact with an upper end of the holder 73 from above and thereby causes the holder 73 and the clamp members 71 to move downward relative to the spindle 40 and the collar 75 while compressing the clamp spring 65. As a result, the clamping force (the force that presses the tool accessory 91 upward against the spindle 40), which is imparted to the clamp head 615 by the clamp spring 65, is released. Accordingly, because the clamp members 71 have been vertically shifted relative to the collar 75, the clamp members 71 are now allowed to move (become movable) from their engagement positions to their disengagement positions against the biasing force of the elastic ring that surrounds the clamp members 71. Therefore, in this vertically-displaced state of the clamp members 71, the user can pull the clamp shaft 61 out of the spindle 40 to replace the tool accessory 91, because the clamp members 71 only weakly hold the clamp shaft 61 owing to the biasing force of the elastic ring.

The structures (elements) disposed within the rear part 39 are now described. As shown in FIGS. 2 and 3, in this embodiment, a rear portion of the rear part 39 is configured as a battery mounting part 391, and a front portion of the rear part 39 is configured as a control-unit housing part 392.

The battery mounting part 391 has an engagement structure (e.g., a pair of slide rails) for sliding engagement with the battery (battery pack, battery cartridge) 93, and terminals that are electrically connectable to corresponding terminals of the battery 93. The structures of the battery mounting part 391 are well known and therefore not described in detail here.

The control-unit housing part 392 houses a control unit 395. Although not shown in detail, the control unit 395 includes a three-phase inverter, a control circuit (for example, a microcomputer having a CPU) for controlling the drive (energization) of the motor 41 via the three-phase inverter, a circuit board having these components mounted thereon, and a case that houses the circuit board. The control unit 395 is electrically connected to the battery mounting part 391 and the switch 29 via electric wires (not shown). Further, in this embodiment, power (current) is supplied via the control unit 395 to the motor 41 and also to a light unit 260 that is described below. Therefore, electric wires 419 (see FIG. 2, in which only one of them is shown) that are connected to the motor 41 and an electric wire 269 (see FIG. 4) that is connected to the light unit 260 extend from the control unit 395. The control unit 395 is configured to supply power (current) to the motor 41 and the light unit 260 when the switch 29 is turned ON.

The structures (elements) disposed inside of the elastic connection part 38 are now described. As shown in FIGS. 2 to 5, the switch holder 20 is disposed in an internal space (i.e. a space circumferentially surrounded by the elastic ribs 381) of the elastic connection part 38. The switch holder 20 is configured to hold the switch 29. Although not shown in detail, even though the switch holder 20 is disposed in the internal space of the elastic connection part 38 (which is a part of the inner housing 3), the switch holder 20 is fixed to the upper shell 27 and the lower shell 28 by screws, and thus forms part of the outer housing 2.

Figure 7:
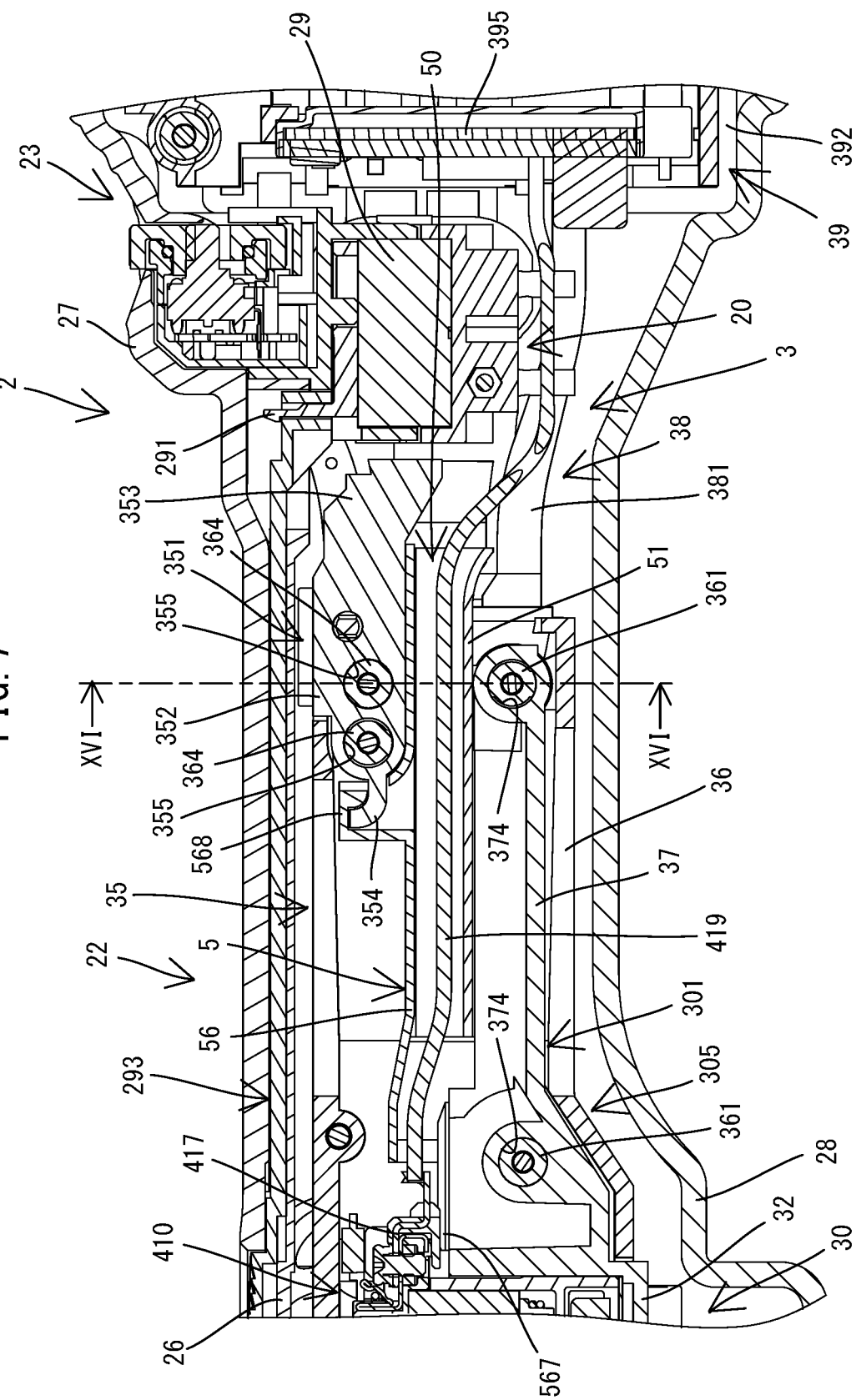
FIG. 7 is another partial, enlarged view of FIG. 2.

The structures (elements) disposed within the extending part 35 are now described. As shown in FIG. 7, an outer shell of the extending part 35 is formed by the outer extending part 36. The inner extending part 37 extends from a front end of the outer extending part 36 to the rear end portion of the outer extending part 36, within the lower portion of the outer extending part 36. Therefore, a space exists above the inner extending part 37 within the outer extending part 36. A portion of a weight 351 and a wire holder 5 are disposed in this space.

The weight (counterweight, supplemental weight) 351 is a member (structure, component) that serves to increase the moment of inertia of the inner housing 3 (particularly, of the front part 30 that houses relatively heavy components and the extending part 35 that is substantially immovably connected to the front part 30) around the driving axis A1. In this embodiment, the weight 351 is separately formed from the extending part 35 and is mounted to (on) a rear end portion of the extending part 35. Thus, the weight 351 of this embodiment serves to both increase the total mass of the inner housing 3 (i.e. inclusive of the weight 351 mounted thereto) and adjust the mass distribution (and the center of gravity) of the inner housing 3. The weight 351 is preferably formed of metal having a higher density than the synthetic resin/polymer that forms the plastic housing 305. Exemplary examples of such metal for the weight 351 include, e.g., iron, zinc, aluminum, and alloys containing any of iron, zinc and aluminum.

As shown in FIGS. 3, 7 and 9, the weight 351 includes a front part 352 and a rear part 353. The rear part 353 extends from a rear end (rear portion) of the front part 352. The cross-sectional area of rear part 353 increases toward the rear. The front part 352 is disposed within the outer extending part 36, and is connected to the outer extending part 36 by screws. Most of the front part 352 overlaps a region above a rear end portion of the inner extending part 37 when viewed from the left (or right). In other words, most of the front part 352 is located directly above the rear end portion of the inner extending part 37 when viewed from the left (or right). The rear part 353 of the weight 351 protrudes rearward of the outer extending part 36. Most of the rear part 353 is disposed in a front portion of the internal space (the space circumferentially surrounded by the elastic ribs 381) of the elastic connection part 38. A procedure for mounting the weight 351 to (on) the extending part 35 (the outer extending part 36) will be described in detail below.

The wire holder 5 is a member (structure, component) that holds electric wires, which extend between the rear part 39 and the front part 30, within the extending part 35 (specifically, within the outer extending part 36). As shown in FIG. 7, in this embodiment, the wire holder 5 holds electric wires that extend from the control unit 395 disposed in the rear part 39 (more specifically, the electric wires 419 that electrically connect the control unit 395 and the motor 41).

In this embodiment, the wire holder 5 is formed separately from the extending part 35, and is held within the outer extending part 36. More specifically, the wire holder 5 is formed as an elongate tubular or hollow box-like body, and defines a passage 50 for the electric wires 419. The passage 50 extends through the wire holder 5 in the front-rear direction. The length of the wire holder 5 in the front-rear direction is slightly longer than the entire length of the extending part 35. A rear end of the wire holder 5 is located rearward of the rear end of the extending part 35 (the outer extending part 36). The electric wires 419 extend in the front-rear direction within the passage 50. The two end portions of each of the electric wires 419 extend from front and rear ends of the wire holder 5, respectively, and are connected to one of the terminals of the terminal block 417 of the motor 41 and one of corresponding terminals of the control unit 395, respectively.

Figure 11:
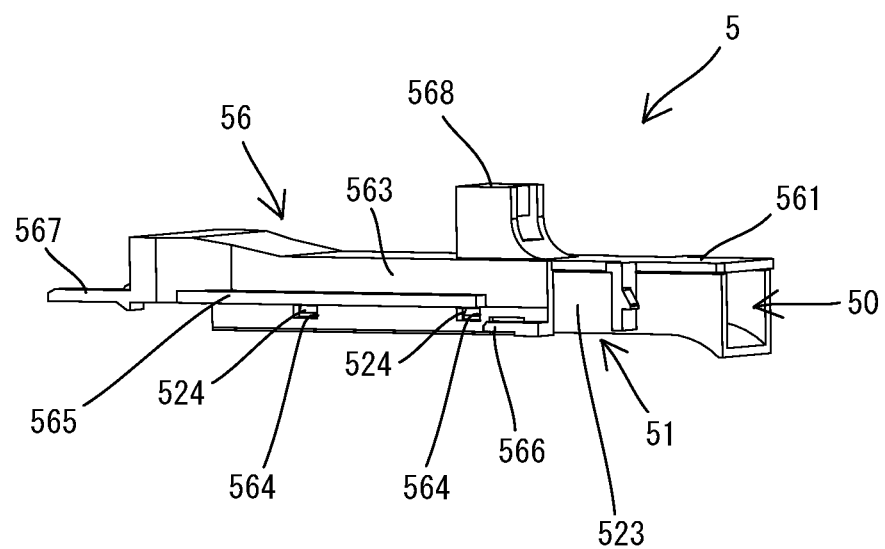
FIG. 11 is a perspective view of a wire holder.
Figure 12:
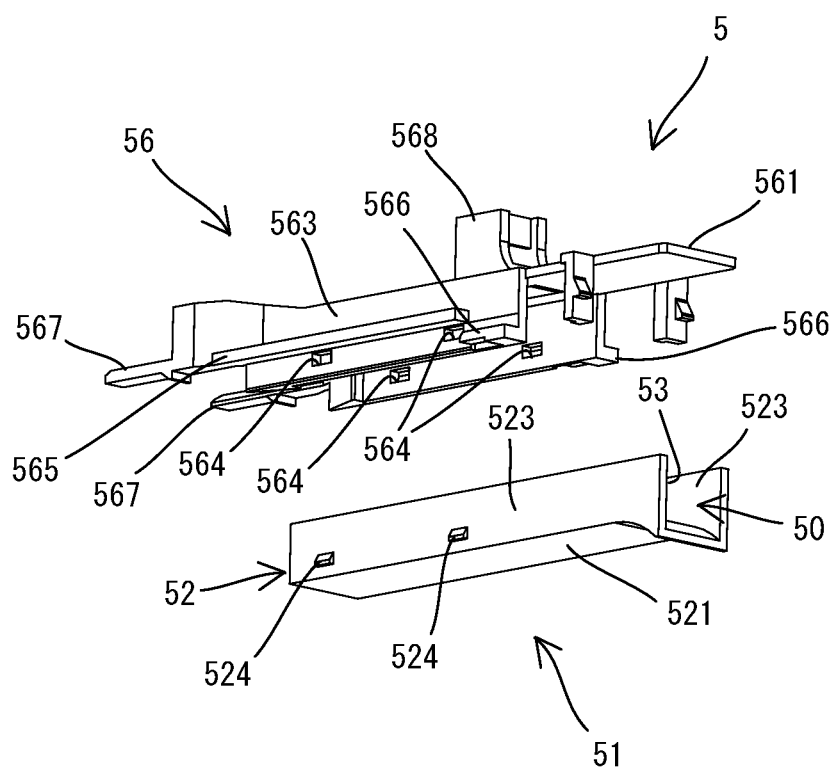
FIG. 12 is an exploded perspective view of the wire holder.

Further, in this embodiment, as shown in FIGS. 11 and 12, the wire holder 5 is formed by a body 51 and a cover 56 that are separately formed from each other and are connected to each other.

The body 51 is an elongate member (structure, component) having a generally U-shaped cross-section. The body 51 has a peripheral wall 52 that defines the passage 50, and an opening 53. The peripheral wall 52 includes a bottom wall 521 having a rectangular shape that is longer in the front-rear direction, and a pair of side walls 523 protruding upward from right and left edges of the bottom wall 521. Each of the side walls 523 has two projections 524. The opening 53 is formed at a top of the body 51 and extends over the entire length of the body 51 in the front-rear direction. Thus, the passage 50 communicates with the outside of the body 51 through the opening 53.

The cover 56 is connected to the body 51 so as to cover the opening 53 of the body 51. In this embodiment, the cover 56 has a rectangular upper wall 561 that covers the opening 53, and two side walls 563 that respectively protrude downward from right and left edges of the upper wall 561. The side walls 563 are disposed outside the side walls 523 of the body 51. Each of the side walls 563 has two engagement holes 564, corresponding to the two projections 524 of the side wall 523 of the body 51. The wire holder 5 is formed by engaging the projections 524 with the engagement holes 564 and thus connecting the body 51 and the cover 56. Further, the cover 56 is configured to be engageable with the inner extending part 37 and the weight 351, which will be described in detail below.

As described above, the switch 29 for starting the motor 41 is held by the rear part 23 of the outer housing 2 via the switch holder 20. Thus, a switching member (switch lever, slide switch) 293, which is connected to an actuation part (e.g., a lever or arm) 291 of the switch 29 for switching ON and OFF the switch 29, is also held by the outer housing 2.

Figure 13:
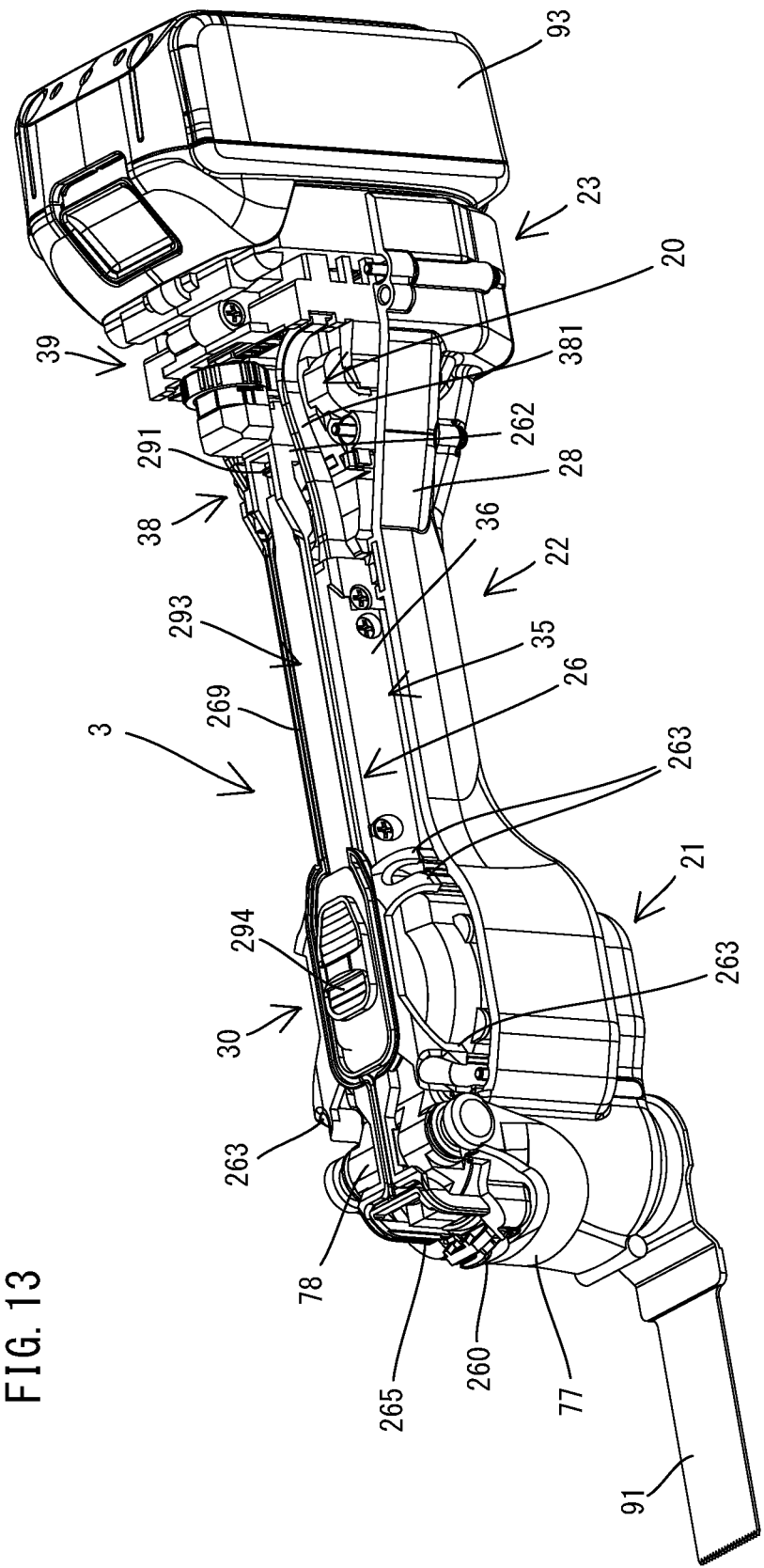
FIG. 13 is a perspective view of the oscillating multi-tool with an upper shell removed therefrom.

As shown in FIGS. 2 and 13, the switching member 293 is an elongate member linearly extending in the front-rear direction. The operation part (tab, knob) 294 is integrally formed on a front end portion of the switching member 293. A rear end portion of the switching member 293 is operably connected to the actuation part 291 of the switch 29. The switching member 293 is configured to move (slide or pivot) the actuation part 291 between an ON position and an OFF position (i.e. configured to switch ON and OFF the switch 29) by moving in the front-rear direction in response to the user manually sliding the operation part 294 in the front-rear direction.

In this embodiment, the switching member 293 is held by an elongate holding member 26 that is supported by the outer housing 2, so as to be movable (slidable) in the front-rear direction relative to the outer housing 2. As shown in FIG. 13, the holding member 26 is supported by the lower shell 28 and the switch holder 20 of the outer housing 2 via support legs 263 and the rear end part 262. Further, as shown in FIG. 10, a groove is formed in a lower surface of a front end portion of the holding member 26. When the lever 77 is placed in the front position, the holding member 26 is supported by the rotary shaft 78 with the groove in engagement with the eccentric part 781 of the rotary shaft 78.

Further, as shown in FIG. 13, the holding member 26 holds not only the switching member 293 but also the light unit 260. The light unit 260 is held by arms 265 formed on a front end of the holding member 26. The light unit 260 is configured to light (illuminate) a working area of the tool accessory 91 through an opening between the upper shell 27 and the lower shell 28. Further, the holding member 26 is configured to guide the electric wire 269 for supplying the power (current) from the control unit 395 to the light unit 260. More specifically, a groove extends from the rear end part 262 to the arm 265 and is formed in an upper surface of the holding member 26. The electric wire 269 is fitted (disposed) and held in this groove.

Structures that elastically connect the outer housing 2 and the inner housing 3 are now described. In this embodiment, the outer housing 2 and the inner housing 3 are elastically connected to each other at multiple positions. Specifically, elastic members are disposed between the front part 21 of the outer housing 2 and the front part 30 of the inner housing 3, between the lever 77 and rotary shaft 78 and the front part 30, and between the switch holder 20 and the rear part 39.

First, structures that elastically connect the front part 21 of the outer housing 2 and the front part 30 of the inner housing 3 are described.

Figure 14:
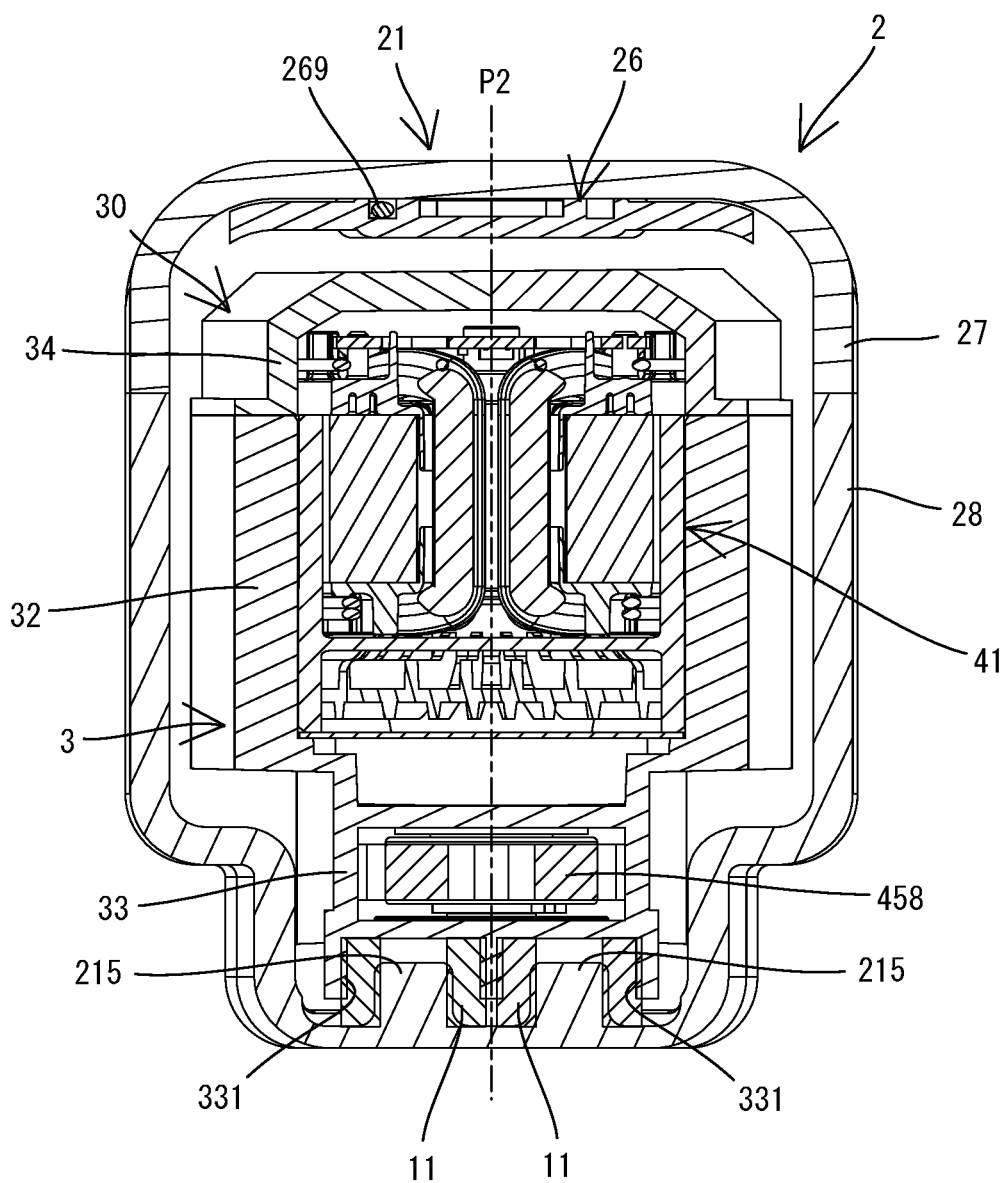
FIG. 14 is a sectional view taken along line XIV-XIV in FIG. 2.

As shown in FIG. 14, two recesses 331 each have a circular cross-section and are formed in a lower wall of the front part 30 of the inner housing 3 (more specifically, a lower wall of the third housing part 33). Two cylindrical projections 215 are formed on a lower wall of the front part 21 of the outer housing 2. The projections 215 protrude upward from the lower wall of the front part 21 so as to face central portions of the recesses 331, respectively. A hollow cylindrical (annular) elastic member 11 is fitted in each of the recesses 331. The projections 215 are respectively fitted inside the elastic members 11.

Structures that elastically connect the rotary shaft 78 and the front part 30 are now described.

As shown in FIG. 10, the rotary shaft 78 is supported by the front part 21 of the outer housing 2 via the lever 77, and extends through the cover part 34 of the front part 30 in the left-right direction. Recesses 343 are respectively formed in left and right walls of the cover part 34. The recesses 343 are recessed inward (toward the center in the left-right direction) and each has a circular cross-section. Two hollow cylindrical (annular) elastic members 13 are fitted around the rotary shaft 78. An inside portion of each of the elastic members 13 is respectively fitted in each of the recesses 343. An outside end surface of each elastic member 13 is respectively held in contact with inner flanges 776, which are formed on the engagement part 772 (i.e. the portion that is engaged with the front part 21) of the lever 77 that is disposed inside a side wall of the front part 21.

Structures that elastically connect the switch holder 20 and the rear part 39 are now described.

As shown in FIG. 3, the switch holder 20 has a generally rectangular box-like shape. Recesses are respectively formed in left and right walls of the switch holder 20. The recesses are each recessed inward (toward the center in the left-right direction). An elastic member 15 is fitted in each recess. An arm 393 protrudes forward from each of the left and right walls of the rear part 39 (the control-unit housing part 392) of the inner housing 3. A projection is formed on (at) a tip end portion of each arm 393 and protrudes inward (toward the center in the left-right direction). The tip end portion of each arm 393 is in contact with an outside surface of the corresponding elastic member 15, and the projections are respectively fitted in through holes of the elastic members 15.

Owing to the above-described structures, the inner housing 3 and the outer housing 2 are movable relative to each other in all directions, including the up-down, front-rear and left-right directions, via the elastic members 11, 13, 15. Thus, the inner housing 3 and the outer housing 2 are elastically connected to each other so as to be capable of coping with (absorbing, attenuating) vibrations generated in any direction. In this embodiment, the elastic members 11, 13, 15 are all formed of urethane-based resin/polymer having a microfoam structure (also referred to as a microcellular structure).

Assembly of the oscillating multi-tool 1 is now described.

First, procedures for mounting the structures (elements, components) in the inner housing 3 and for connecting the metal housing 301 and the plastic housing 305 are described.

First, an assembler (a person who assembles the oscillating multi-tool 1) places the spindle 40, the transmitting mechanism 45, components of the motor 45 other than the stator assembly 410, and the fan 42 into the housing part 302 that forms a front portion of the metal housing 301 (see FIG. 8).

Then, the assembler electrically connects electric wires extending from the control unit 395 (see FIG. 9) to the appropriate components. Specifically, the assembler respectively connects one end of three of the electric wires 419 to three terminals of the terminal block 417 of the stator assembly 410. The assembler further connects one end of an electric wire (not shown) to the switch 29 held by the switch holder 20. Thus, before the inner housing 3 is assembled, the control unit 395 is connected in advance at least to the stator assembly 410 and the switch holder 20 via the electric wires.

The assembler retains the electric wires 419 that connect the control unit 395 and the stator assembly 410 in the wire holder 5 (see FIG. 12). Specifically, the assembler lays the electric wires 419 within the body 51 (the passage 50) and fits the cover 56 onto the body 51 from above. The cover 56 is moved relative to the body 51 while the side walls 563 abut on the projections 524 of the body 51 and elastically deform slightly outward. When the projections 524 reach the engagement holes 564 of the cover 56, the side walls 563 return to their original positions and the projections 524 engage with the engagement holes 564. Thus, the connection of the cover 56 to the body 51 is completed and most of the electric wires 419 are laid within the wire holder 5. A space exists around the electric wires 419 within the passage 50, which allows the assembler to move the wire holder 5 relative to the electric wires 419 in an extension direction of the electric wires 419.

The assembler places the stator assembly 410 (see FIG. 9) within the housing part 302 (specifically, in the second housing part 302) of the metal housing 301. The assembler then engages the wire holder 5 with the inner extending part 37 of the metal housing 301.

More specifically, as shown in FIG. 8, a recess 371, which is recessed downward, is formed in an upper end portion of the inner extending part 37. The recess 371 is configured such that a lower portion of the wire holder 5 is fitted therein. Further, an engagement groove 372 is formed in an upper rear end portion of each of side walls of the inner extending part 37 that define the recess 371. The engagement groove 372 extends from a rear end of the upper rear end portion of the inner extending part 37 toward the front.

As shown in FIGS. 9 and 11, two protruding parts 565 are respectively formed on side walls (specifically, on the pair of side walls 563 of the cover 56) of the wire holder 5. The protruding parts 565 respectively protrude to the left and right and extend in the front-rear direction. When the lower portion of the wire holder 5 is fitted in the recess 371 of the inner extending part 37, the protruding parts 565 are respectively placed on upper end surfaces of the side walls of the inner extending part 37. Further, two projection pieces 566 respectively protrude to the left and right from the side walls (specifically, the side walls 563 of the cover 56) of the wire holder 5. The projection pieces 566 are respectively provided rearward of and below the protruding parts 565. Each of the projection pieces 566 has a shape conforming (complementary) to the engagement groove 372 of the inner extending part 37. Further, left and right projection pieces 567 protrude forward from a front end of the wire holder 5 (specifically, a front end of the cover 56).

The assembler fits the lower portion of the wire holder 5 in the recess 371 (see FIG. 8) of the inner extending part 37 and engages the projection pieces 566 (see FIG. 11) with the engagement grooves 372, respectively, while sliding the wire holder 5 forward. At this time, as shown in FIGS. 7 and 9, the projection pieces 567 on the front end of the wire holder 5 are inserted between an upper end of a front end portion of the inner extending part 37 and the terminal block 417. By using the above-described procedures, the assembler can ensure that the wire holder 5 is stably held on the metal housing 302. The wire holder 5 covers most of the electric wires 419, which extend from the rear part 39 to the front part 30 of the inner housing 3. Such arrangement can reduce the possibility that the electric wires 419 interfere in subsequent assembling work, thereby facilitating the subsequent assembly procedures.

Thereafter, the assembler engages the weight 351 with the wire holder 5. More specifically, as shown in FIG. 7, a projection 354 protrudes forward from a front end of the weight 351 and is curved upward toward the front. Correspondingly, as shown in FIGS. 7 and 11, a protruding part (hooked flange) 568 protrudes upward from the wire holder 5 (specifically, from the cover 56) and has an internal space open to the rear. An upper wall of the protruding part 568 has a shape conforming (complementary) to the projection 354 of the weight 351. Specifically, the upper wall of the protruding part 568 has a lower surface curved upward from its rear end toward the front.

The assembler inserts the projection 354 of the weight 351 into the protruding part 568, and places the weight 351 on the wire holder 5 (the upper wall 561 of the cover 56) as shown in FIGS. 7 and 9. At this time, the projection 354 engages with the upper wall of the protruding part 568. By using the above-described procedures, the assembler can ensure that the weight 351 is stably held on the wire holder 5 and thus on the metal housing 301.

Subsequently, the assembler fixedly connects the plastic housing 305 to the metal housing 301. In this embodiment, as shown in FIGS. 7 and 9, the plastic housing 305 and the metal housing 301 are fixedly connected with each other by connecting the inner extending part 37 and the outer extending part 36 using multiple screws.

More specifically, two through holes 374 extend through the inner extending part 37 of the metal housing 301 in the left-right direction. The through holes 374 are arranged spaced apart from each other in the front-rear direction. The rear through hole 374 is formed in the rear end portion of the inner extending part 37 (a rear end portion of the metal housing 301). The front through hole 374 is formed in the front end portion of the inner extending part 37. Thus, the front through hole 374 is located behind and adjacent to the housing part 302.

Figure 15:
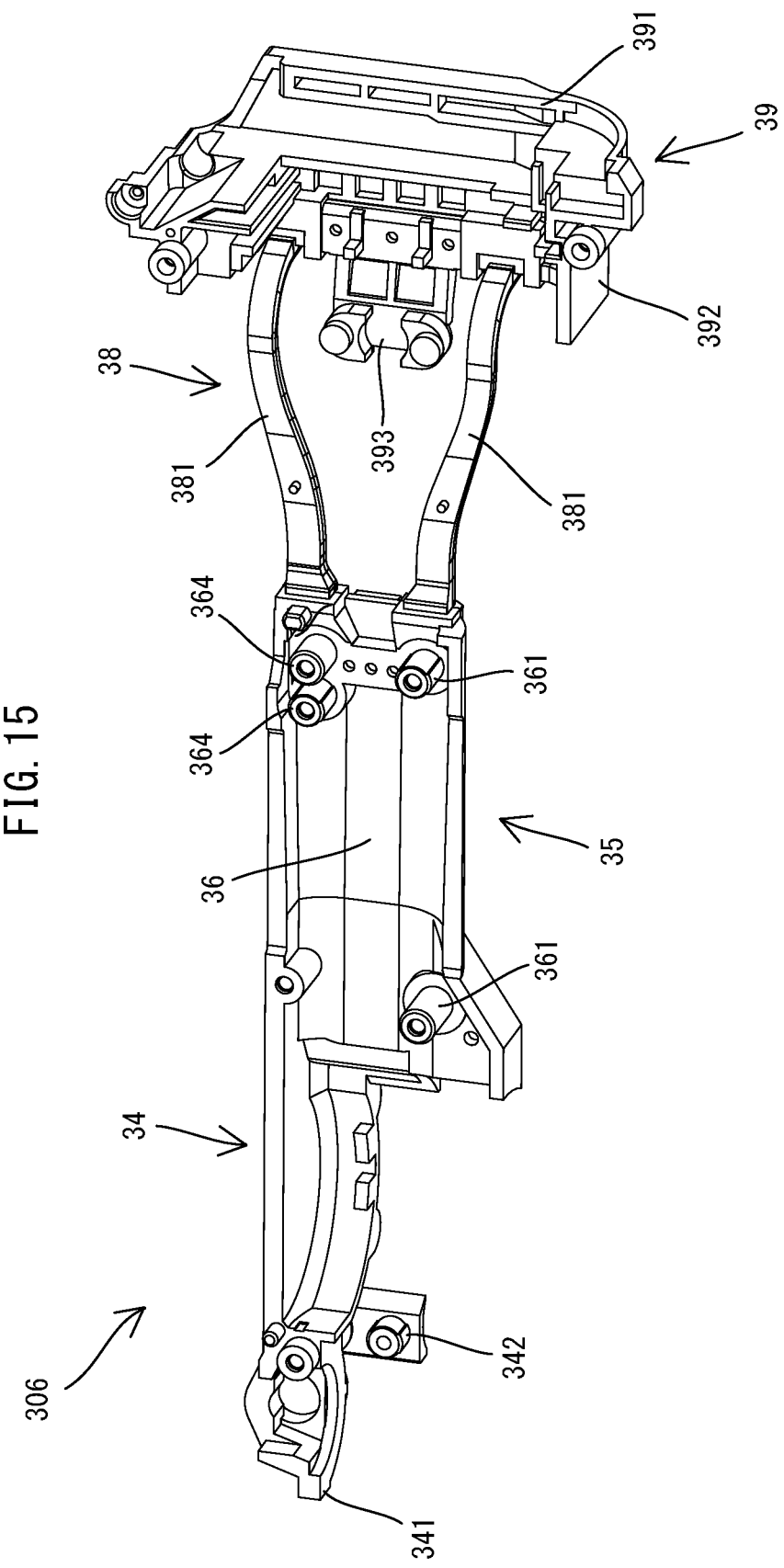
FIG. 15 is a perspective view of a right shell.
Figure 16:
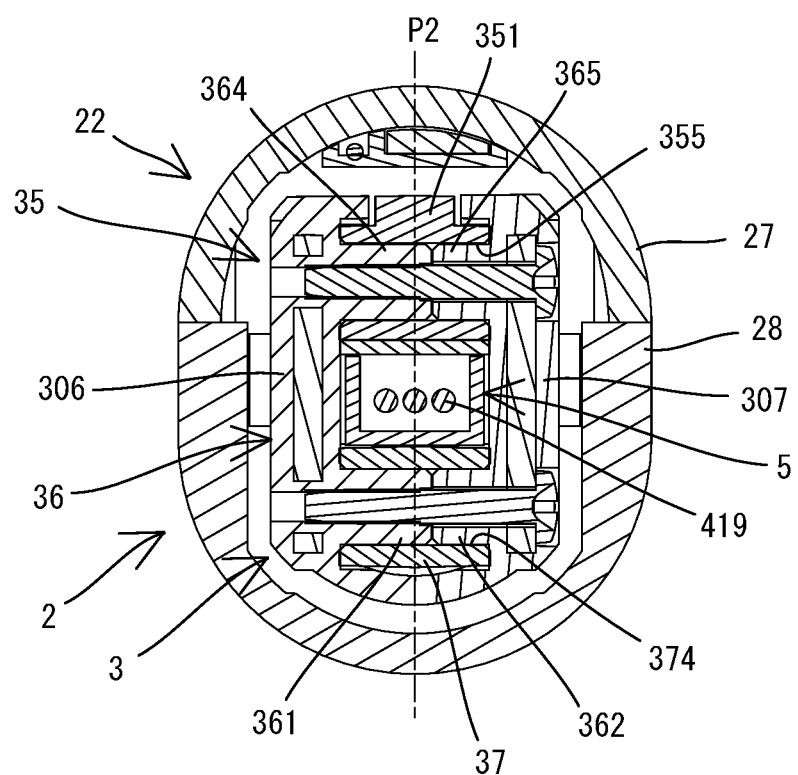
FIG. 16 is a sectional view taken along line XVI-XVI in FIG. 7.

Correspondingly, as shown in FIGS. 15 and 16, two cylindrical (boss) parts 361 protrude to the left from a portion of the right shell 306 that forms the outer extending part 36. The two cylindrical parts 361 are respectively formed at positions corresponding to the two through holes 374 of the inner extending part 37. More specifically, the rear cylindrical part 361 is formed on a lower rear end portion of the outer extending part 36, and the front cylindrical part 361 is formed on a lower front end portion of the outer extending part 36. Each of the cylindrical parts 361 has a threaded inner peripheral surface.

Similarly, two cylindrical (boss) parts 362 protrude to the right from a portion of the left shell 307 that forms the outer extending part 36. Although only the rear one of the cylindrical parts 362 is shown in FIG. 16, the front cylindrical part 362 has substantially the same structure as the rear cylindrical part 362. The two cylindrical parts 362 are respectively formed at positions corresponding to the two through holes 374 of the inner extending part 37, and respectively face (oppose) the two cylindrical parts 361 of the right shell 306.

The assembler fits the metal housing 301, on which the wire holder 5 and the weight 351 are held, into the right shell 306, while inserting the cylindrical parts 361 into the through holes 374 of the inner extending part 37. The assembler then fits the left shell 307 onto the metal housing 301, on which the wire holder 5 and the weight 351 are held, while inserting the cylindrical parts 362 into the through holes 374. Thus, the outer extending part 36 engages with the inner extending part 37.

Before fitting the left shell 307 onto the metal housing 301, the assembler positions the rotary shaft 78 (see FIG. 9) such that a right end portion of the rotary shaft 78 protrudes from a through hole formed in a front end portion of the right shell 306. Recesses are respectively formed in portions of the right shell 306 and the left shell 307 that are disposed on an upper side of the eccentric part 781 of the rotary shaft 78. Therefore, when the right shell 306 and the left shell 307 are fitted onto the metal housing 301, an opening is formed by these recesses above the eccentric part 781 (see FIG. 10), and a left end portion of the rotary shaft 78 protrudes from (through) a through hole of the left shell 307.

The right shell 306 and the left shell 307 also engage with the weight 351 when fitted onto the metal housing 301. Further, front end portions of the right shell 306 and the left shell 307 engage with a front end portion of the metal housing 301.

More specifically, as shown in FIGS. 7, 9 and 16, two through holes 355 extend through the weight 351 in the left-right direction. The through holes 355 are arranged side by side in the front-rear direction in the front part 352 (i.e. the portion that is disposed within the outer extending part 36) of the weight 351. The rear through hole 355 is located directly above the rear through hole 374 of the inner extending part 37.

Correspondingly, as shown in FIGS. 15 and 16, two cylindrical (boss) parts 364 protrude to the left from a portion of the right shell 306 that forms the rear end portion of the outer extending part 36. The two cylindrical parts 361 are respectively formed at positions corresponding to the two through holes 355 of the weight 351. More specifically, the rear cylindrical part 364 is formed on an upper rear end portion (directly above the rear cylindrical part 361) of the outer extending part 36, and the front cylindrical part 364 is formed in front of and adjacent to the rear cylindrical part 364. Each of the cylindrical parts 364 has a threaded inner peripheral surface.

Similarly, two cylindrical (boss) parts 365 protrude to the right from a portion of the left shell 307 that forms the rear end portion of the outer extending part 36. The two cylindrical parts 365 are respectively formed at positions corresponding to the two through holes 355 of the weight 351, and face (oppose) the two cylindrical parts 364 of the right shell 306. Although only the rear one of the cylindrical parts 365 is shown in FIG. 16, the front cylindrical part 365 also has substantially the same structure as the rear cylindrical part 365.

When the right shell 306 and the left shell 307 of the above-described structure are fitted onto the metal housing 301 as described above, the cylindrical parts 364, 365 are respectively fitted into the through holes 355 of the weight 351. Thus, the weight 351 is engaged with the plastic housing 305.

Figure 17:
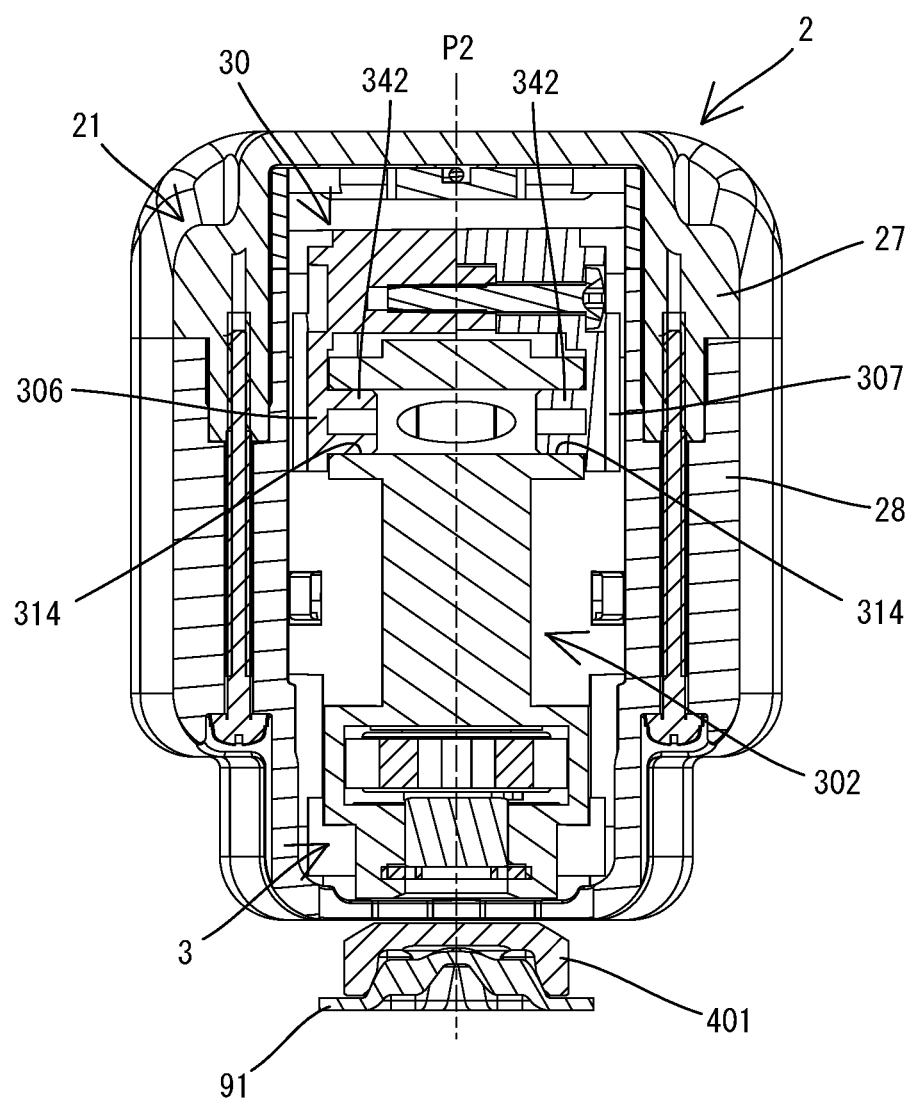
FIG. 17 is a sectional view taken along line XVII-XVII in FIG. 2.

Further, as shown in FIGS. 9 and 15, a projection 341 protrudes forward from a front end of each of the right and left shells 306, 307 (a front end of the cover part 34). As shown in FIGS. 9 and 17, cylindrical (boss) parts 342 protrude to the left and right on the insides of the front end portions of the right and left shells 306, 307, respectively.

Correspondingly, as shown in FIGS. 6 and 9, a protruding part 311 protrudes upward from an upper front end portion of the housing part 302 of the metal housing 301 (specifically, from an upper front end portion of the first housing part 31). The protruding part 311 has an engagement groove 312 that is recessed forward from a rear end of the protruding part 311. The engagement groove 312 is configured to engage with the two projections 341 of the right and left shells 306, 307. Further, as shown in FIGS. 9 and 17, a pair of right and left recesses 314 is formed in a central portion of the housing part 302 of the metal housing 301 (more specifically, at a boundary between the first housing part 31 and the second housing part 32). The recesses 314 are configured to respectively engage with the cylindrical parts 342 of the right and left shells 306, 307.

Thus, when the right shell 306 and the left shell 307 are fitted onto the metal housing 301, the projections 341 engage with the engagement groove 312, and the cylindrical parts 342 are respectively fitted (inserted) into the recesses 314. Thus, the front end portion (the cover part 34) of the plastic housing 305 is engaged with the front end portion of the metal housing 301.

As described above, the control unit 395 is connected to the electric wires 419, and the switch 29 is connected to the control unit 395 via an electric wire (not shown). Therefore, when fitting the right and left shells 306, 307 onto the metal housing 301, the assembler fits the control unit 395 into a portion that forms the rear part 39 and engages the arms 393 with the elastic members 15 mounted on the switch holder 20.

Subsequently, as shown in FIGS. 9 and 16, the assembler inserts a screw through each of the cylindrical parts 362 of the left shell 307 and threadably engages the screws with the cylindrical parts 361 of the right shell 306. Therefore, the right shell 306, the inner extending part 37 and the left shell 307 are firmly connected together without a gap in the left-right direction, owing to axial forces of the screws. Similarly, the assembler inserts a screw through each of the cylindrical parts 365 of the left shell 307 and threadably engages the screws with the cylindrical parts 364 of the right shell 306. Therefore, the right shell 306, the weight 351 and the left shell 307 are also firmly connected together, owing to axial forces of the screws.

Further, as shown in FIG. 9, the assembler connects the right shell 306 and the left shell 307 at multiple connection positions in addition to the above-described connection positions. More specifically, additional connection positions are provided in the front end portion of the cover part 34, the upper front end portion of the outer extending part 36 and the rear part 39. At these connection positions, however, only the right shell 306 and the left shell 307 are directly connected to each other, and the metal housing 301 and the plastic housing 305 are not directly connected by the screws.

By using the above-described procedures, the structures (elements, components) can be mounted (placed) in the inner housing 3 and the metal housing 301 can be connected to the plastic housing 305 in an efficient and effective manner.

Procedures for mounting the inner housing 3 and other structures (elements, components) in the outer housing 2 and for connecting the upper shell 27 and the lower shell 28 are now described.

The assembler inserts the two end portions of the rotary shaft 78 through the elastic members 13, and fits the inside portions of the elastic members 13 into the recesses 343 of the cover part 34, respectively. The assembler further connects the engagement parts 772 of the lever 77 to the two end portions of the rotary shaft 78, respectively. Specifically, the assembler elastically deforms the lever 77 to widen the distance between the engagement parts 772, and fits the end portions of the rotary shaft 78 into recesses formed in the insides of the engagement parts 772. Thus, the rotary shaft 78 and the lever 77 are integrally connected to be rotatable (pivotable) together. Furthermore, the elastic members 13 are held between the cover part 34 and the inner flanges 776 of the lever 77 in the left-right direction (see FIG. 10).

The assembler then positions the holding member 26, in which the switching member 293 is fitted, on components connected to the outer housing 2. Specifically, the assembler places the rear end part 262 of the holding member 26 on the switch holder 20, and places the front end portion of the holding member 26 on the eccentric part 781 of the rotary shaft 78 (see FIGS. 4 and 10). Further, the assembler fits the electric wire 269 within the groove of the holding member 26 and mounts the light unit 260 on the arms 265 so as to be held by the arms 265.

Subsequently, the assembler positions the inner housing 3, on (in) which the rotary shaft 78, the lever 77 and the holding member 26 are temporarily held, within the upper shell 27 of the outer housing 2, and covers the inner housing 3 with the lower shell 28. At this time, the left and right engagement parts 772 of the lever 77 are held between the upper shell 27 and the lower shell 28 from above and below. The assembler connects the upper shell 27 and the lower shell 28 at multiple positions by screws (see, for example, FIG. 17). Thus, the inner housing 3 is housed within the outer housing 2, and the lever 77 and the rotary shaft 78 are supported by the outer housing 2 to be rotatable (pivotable) around the rotational axis A3, thereby completing the assembly of the oscillating multi-tool 1.

As described above, the oscillating multi-tool 1 of this embodiment has a so-called vibration-isolating housing structure, which includes the outer housing 2 and the inner housing 3 that are elastically connected to each other. Because the inner housing 3 includes both the extending part 35 and the front part 30 that houses the spindle 40, the inner housing 3 has an elongated shape. This elongated structure serves to increase the moment of inertia of the inner housing 3 around the driving axis A1, thereby reducing unnecessary movement of the inner housing 3 relative to the outer housing 2 and thus deterioration in working efficiency of the tool accessory.

Furthermore, in this embodiment, the weight 351 is mounted to (at) the rear end portion of the extending part 35 and thereby further increases the moment of inertia of the inner housing 3. The combination of the extending part 35 and a portion of the inner housing 3 that houses the drive parts (i.e. the motor 41, the transmitting mechanism 45 and the spindle 40) acts (functions) as a rigid body. More specifically, because the front part 30 and the extending part 35 together act (function) as a rigid body in this embodiment, the moment of inertia of the combination of the front part 30 and the extending part 35 can be most effectively increased by arranging (placing) the weight 351 such that a portion (the rear part 353) of the weight 351 protrudes rearward of the rear end of the extending part 35.

Further, in this embodiment, the extending part 35 is formed by the combination of the inner extending part 37 of the metal housing 301 and the outer extending part 36 of the plastic housing 305.

Because the outer extending part 36 is formed of synthetic resin/polymer, the outer extending part 36 is susceptible to effects (e.g., softening, contraction, expansion, etc.) caused by changes in temperature and/or humidity. For example, in a high temperature and/or high humidity environment, the normally stiff (rigid) outer extending part 36 may soften such that it becomes more elastically deformable (bendable) and thereby may act like a spring (elastic) element. Therefore, for example, if a mass (such as the weight 351 in this embodiment) were to be hypothetically attached to the rear end portion of the outer extending part 36 that is formed of synthetic resin/polymer, in a high temperature and/or high humidity environment, the mass (weight 351) might resonate in response to vibration generated by oscillatory driving of the tool accessory 91 owing to the bendability (deformability) of the outer extending part 36, such that the intended vibration-isolating effect would be reduced. The present embodiment avoids this potential mass-resonating problem by providing the inner extending part 37, which is a portion of the metal housing 301 that extends from the housing part 302 to the rear of the center of the outer extending part 36 in the front-rear direction. Therefore, because the inner extending part 37 is made of metal and thus is not susceptible to effects of high temperature and/or high humidity (i.e. its stiffness is not impaired by high temperature and/or high humidity), it functions like a reinforcing rod (cantilever beam) for supporting the outer extending part 36 and thereby suppresses or inhibits resonating motion of the mass (weight 351). As described above, the inner extending part 37 can reduce the possibility that the outer extending part 36 acts like a spring element (even in a high temperature and/or high humidity environment), which would have the undesirable result of reducing the vibration isolating effect.

In this embodiment, the plastic housing 305 is formed by the right shell 306 and the left shell 307 being connected together in the left-right direction. Further, the right and left shells 306, 307 are connected together while holding the inner extending part 37 therebetween. Owing to such a design, the metal housing 301 and the plastic housing 305 can be reliably connected to form the inner housing 3. Thus, reliable and easy assembly of the inner housing 3 can be realized.

Further, in this embodiment, the metal housing 301 includes the housing part 302 that houses the drive parts (the motor 41, the transmitting mechanism 45 and the spindle 40) and the inner extending part 37, which are formed as a single (integral) metal structure (frame, chassis) without a seam therebetween, e.g., by a metal casting or metal machining method. Therefore, compared with an embodiment in which the housing part 302 and the inner extending part 37 are formed separately from each other and then are subsequently connected together, the rigidity of the metal housing 301 as a whole can be increased, while also reducing the number of components (part count).

Further, a screw connects the metal housing 301 (in particular, the inner extending part 37 thereof) to the right and left shells 305, 306 of the plastic housing 305 at the rear end portion of the extending part 35 (at the position where the cylindrical parts 361, 362 are inserted into and engage the rear through hole 374). Thus, the metal housing 301 and the plastic housing 305 are connected to each other at a position of the inner extending part 37 that is farthest from the spindle 40 in the front-rear direction. Such an arrangement can most effectively increase the rigidity of the front part 30 and the extending part 35 as a whole. Specifically, misalignment (displacement) between the plastic housing 305 and the metal housing 301, which may be caused by rotation of the plastic housing 305 around the driving axis A1 relative to the metal housing 301 during operation, can be effectively reduced.

In this embodiment, a (i.e. another) screw connects the metal housing 301 to the right and left shells 305, 306 of the plastic housing 305 at the front end portion of the extending part 35 (at the position where the cylindrical parts 361, 362 are inserted into and engage the front through hole 374). Therefore, misalignment (displacement) between the plastic housing 305 and the metal housing 301 during operation can be further reliably reduced.

Further, in this embodiment, in addition to the inner extending part 37, the weight 351 is also held between portions of the right and left shells 306, 307 that form the outer extending part 36. Therefore, the weight 351 can be reliably connected and easily mounted to the outer extending part 36. Further, most of the front part 352 of the weight 351 is located directly above the rear end portion of the inner extending part 37. Thus, the inner extending part 37 and the weight 351 are rationally arranged by effectively utilizing the limited amount of (unused) space within the outer extending part 36.

Further, in this embodiment, the wire holder 5 is disposed in the extending part 35 and holds the electric wires 419, which extend from the control unit 395 that is housed in the rear part 39. When the oscillating multi-tool 1 is being assembled, the wire holder 5 holds the electric wires 419 (which are otherwise easily bendable and displaceable) in position in the interior of the oscillating multi-tool 1, thereby facilitating the assembly of the oscillating multi-tool 1. Further, in this embodiment, the wire holder 5 is formed separately from the inner housing 3 and is housed in the outer extending part 36. Moreover, the wire holder 5 is formed by connecting the body 51 and the cover 56 that are formed separately from each other. Therefore, as described above, the manual work of placing the electric wires 419 in the wire holder 5 and housing (placing) the wire holder 5 in the inner housing 3 can be further facilitated.

Further, in this embodiment, the wire holder 5 is disposed in the outer extending part 36 together with the inner extending part 37 and the weight 351. More specifically, a portion of the wire holder 5 is disposed between the inner extending part 37 and the weight 351 in the up-down direction. Thus, the inner extending part 37, the weight 351 and the wire holder 5 are rationally arranged by effectively utilizing the limited amount of (unused) space within the outer extending part 36. Further, as described above, the wire holder 5 is partially engageable with the inner extending part 37 and also with the weight 351. Such an engagement structure can realize a temporarily fixing function during the assembly and thus further facilitate the assembly.

Further, in this embodiment, the metal housing 301 and the plastic housing 305 respectively have engagement parts that engage with each other without being connected by screws. Specifically, the metal housing 301 has the engagement groove 312 that is provided in front of the spindle 40 (specifically, in the upper front end portion of the housing part 302), and the recesses 314 that are provided between the spindle 40 and the motor 41 in the front-rear direction (specifically, in left and right central portions of the housing part 302). Correspondingly, the plastic housing 305 has the projections 341 that are provided in front of the spindle 40 (specifically, on the front end portion of the cover part 34) to be engaged with the engagement groove 312, and the cylindrical parts 342 that are provided between the spindle 40 and the motor 41 in the front-rear direction (specifically, on the insides of the front end portions of the right and left shells 306, 307) to be engaged with the recesses 314.

Because the engagement groove 312 and the projections 341 engage with each other, movement of the metal housing 301 relative to the plastic housing 305 in the up-down direction is restricted. Furthermore, because the recesses 314 and the cylindrical parts 342 engage with each other, movement of the metal housing 301 relative to the plastic housing 305 in a direction intersecting an axis of the cylindrical parts 342 is also restricted. Specifically, because the axis of the cylindrical parts 342 extends in the left-right direction, movement of the metal housing 301 relative to the plastic housing 305 in both the front-rear direction and the up-down direction can be restricted.

In this embodiment, as described above, when the clamping force is released in response to manually pivoting the lever 77, the upward biasing force of the clamp spring 65 acts on the cover part 34 via the rotary shaft 78. However, owing to the engagement between the engagement groove 312 and the projections 341 and the engagement between the recesses 314 and the cylindrical parts 342, upward movement of the plastic housing 305 relative to the metal housing 301 can be effectively restricted. Particularly, in this embodiment, the upward relative movement of the plastic housing 305 can be more reliably restricted in front of and behind the spindle 40 (i.e. in front of and behind a position where the rotary shaft 78 receives the biasing force).

Further, the above-described engagement structures that restrict the upward relative movement of the plastic housing 305 can also serve to minimize the number of screws that are required to connect the metal housing 301 and the plastic housing 305. More specifically, the assembler needs to connect the metal housing 301 and the plastic housing 305 in the left-right direction by screws only at two positions in the extending part 35, and need not connect the metal housing 301 and the plastic housing 305 in the up-down direction by screws in the front part 30. Therefore, the assembly work can be further facilitated. Further, although the assembler needs to connect the right shell 306 and the left shell 307 at multiple positions in the left-right direction by screws, as described above, the screws can be tightened at these positions in the same direction as the direction in which the metal housing 301 and the plastic housing 305 are tightened at their connection positions. Therefore, working efficiency can also be improved.

Correspondences between the features of the above-described embodiment and the features of the present disclosure are as follows. The features of the above-described embodiment are merely exemplary and do not limit the features of the present disclosure or the present invention.

The oscillating multi-tool (or simply "multi-tool") 1 is an example of the "power tool". The tool accessory 91 is an example of the "tool accessory". The spindle 40 is an example of the "spindle". The driving axis A1 is an example of the "driving axis" and the "first axis". The motor 41 and the output shaft 413 are examples of the "motor" and the "output shaft", respectively. The rotational axis A2 is an example of the "second axis". The transmitting mechanism 45 is an example of the "transmitting mechanism". The inner housing 3, the front part 30 and the extending part 35 are examples of the "inner housing", the "front part" and the "extending part", respectively. The outer housing 2, the front part 21, the rear part 23 and the grip part (intermediate part) 22 are examples of the "outer housing", the "front part", the "rear part" and the "grip part", respectively. The metal housing 301 and the plastic housing 305 are examples of the "first inner housing portion" and the "second inner housing portion", respectively. The housing part 302, the inner extending part 37 and the outer extending part 36 are examples of the "housing part", the "first extending part" and the "second extending part", respectively.

The left shell 307 and the right shell 306 are examples of the "left member" and the "right member", respectively. Each of the engagement groove 312 and the recess 314 is an example of the "first engagement part". Each of the projection 341 and the cylindrical part 342 is an example of the "second engagement part". The weight 351 is an example of the "weight", "counterweight" or "supplemental weight". The wire holder 5 is an example of the "holder".

The above-described embodiment is merely an exemplary embodiment of the present disclosure, and thus power tools according to the present disclosure are not limited to the oscillating multi-tool 1 of the above-described embodiment. For example, the following modifications may be made. Further, one or more of these modifications may be employed in combination with the oscillating multi-tool 1 of the above-described embodiment or any one of the claimed features.

For example, the structures for elastically connecting the outer housing 2 and the inner housing 3 may be appropriately changed. For example, each of the elastic members 11, 13, 15 may be formed of a material that is different from the material of the above-described embodiment. For example, rubber, a spring element or a different kind of synthetic resin/polymer may be employed. The numbers, shapes and positions of the elastic members 11, 13, 15 may be appropriately changed, as long as the outer housing 2 and the inner housing 3 are elastically connected to be movable relative to each other. Preferably, however, at least the front part 30 of the inner housing 3 (i.e. the portion that houses the spindle 40) is elastically connected to the front part 21 of the outer housing 2 (the portion that houses the front part 30 therein). The number of the elastic members is not particularly limited, but, preferably, a plurality of elastic members is provided.

The outer housing 2 may be formed, for example, by a right shell and a left shell being connected together, instead of the upper shell 27 and the lower shell 28. The switch holder 20 need not necessarily be formed as part of the outer housing 2.

The shapes and components of the metal housing 301 and the plastic housing 302 that form the inner housing 3 and the manner of connecting the metal housing 301 and the plastic housing 302 may be appropriately changed.

For example, the metal housing 301 may be formed by multiple metal members that are at least substantially immovably connected to each other. The housing part 302 may be configured to house only the spindle 40 and the transmitting mechanism 45, and the plastic housing 305 may be configured to house the motor 41. The cover part 34 may be formed by a portion of the metal housing 301, rather than a portion of the plastic housing 305. The extending part 35 and the rear part 39 need not necessarily be connected via the elastic connection part 38. Specifically, the extending part 35 and the rear part 39 may be connected directly to each other. In the structure having the elastic connection part 38, the number, shape and circumferential arrangement positions of the elastic ribs 381 may be appropriately changed. Further, the elastic connection part 38 and the rear part 39 may be omitted. In other words, the rear end of the extending part 35 may define a rear end of the inner housing 3. The inner housing 3 may be formed by an upper member and a lower member being connected together.

As for the inner extending part 37, the length, shape, arrangement position within the outer extending part 36 and the manner of connecting the inner extending part 37 to the outer extending part 36 may be appropriately changed. For example, the inner extending part 37 need not necessarily extend to the rear end portion of the outer extending part 36, as long as the inner extending part 37 extends rearward of (i.e. the rear end of the inner extending part 37 is located rearward of) the center of the outer extending part 36 in the front-rear direction. The inner extending part 37 may be disposed in an upper portion or in a central portion in the up-down direction, rather than in the lower portion of the outer extending part 36. Preferably, the inner extending part 37 and the outer extending part 36 may be connected by a screw at least at one position on the rear end portion of the inner extending part 37. More preferably, like in this embodiment, the inner extending part 37 and the outer extending part 36 may also be connected at the front end part of the inner extending part 37. Further, the inner extending part 37 and the outer extending part 36 may be connected at a central portion of the inner extending part 37, or at multiple positions on (at) the rear end portion of the inner extending part 37.

The outer extending part 36 may be formed at least partially in a rod-like shape extending in the front-rear direction, rather than in a hollow cylindrical (tubular) shape in its entirety. Alternatively, the outer extending part 36 may be formed at least partially in a shape of a pair of arms extending in the front-rear direction. The outer extending part 36 and the cover part 34 may be formed separately from each other and connected together in the front-rear direction.

The number, size, shape, material and position of the weight 351 may be appropriately changed. For example, a plurality of discrete weight components may be provided as the weight 351. In such an embodiment, the weight components may be different in size and shape. The weight 351 need not necessarily be fixed to the extending part 35 while being held between the right shell 306 and the left shell 307. Specifically, for example, the weight 351 may be fixed to an outer surface of the outer extending part 36, or may be integrally formed with the outer extending part 36. The weight 351 need not necessarily be disposed in the rear end portion of the extending part 35. The weight 351, however, may be preferably disposed in (at) a position relatively far from the driving axis A1, e.g., in (at) a portion such that it functions (acts) as a rigid body together with a housing part of the inner housing 3 that houses the drive part (the motor 41, the transmitting mechanism 45 and the spindle 40). The position of the weight 351 may be changed, according to any change of the inner extending part 37. Further, the weight 351 may be omitted.

The size, shape and components of the wire holder 5 disposed within the outer extending part 36 may also be appropriately changed. The position of the wire holder 5 may be changed according to any change of the inner extending part 37 and/or the weight 351. The electric wire(s) held by the wire holder 5 is (are) not limited to the electric wire(s) connected to the motor 41. For example, the electric wire(s) held by the wire holder 5 may be connected to one or more other electrical components (e.g. a sensor) that is (are) disposed within the front part 30 or in the extending part 35. The structures that serve to engage the wire holder 5 with the inner extending part 37 and/or the weight 351 are not limited to those of the above-described embodiment. Alternatively, such engagement structures may be omitted. Further, the wire holder 5 itself may be omitted.

The structures of the mechanisms (e.g. the spindle 40, the motor 41, the transmitting mechanism 45, the clamping mechanism 60 and the control unit 395) that are disposed within the inner housing 3, and the structures of the members (elements, components) (e.g. the lever 77, the rotary shaft 78 and the switching member 293) that are supported by the outer housing 2 are not limited to those of the above-described embodiment, but may be appropriately changed. For example, the spindle 40 may extend from a lower end portion to an upper end portion of the first housing part 31. In such an embodiment, the structure of the clamping mechanism 60 may be appropriately changed. The clamping mechanism 60 may be disposed within the spindle 40. The motor 41 may be an AC motor, or a motor with a brush. The oscillating multi-tool 1 may have a power cord that is connectable to an external AC power source, in place of the battery mounting part 391. In such an embodiment, the control unit 395, which is disposed in the rear part 39, may include an AC-DC converter that is connected to the power cord and configured to convert alternating current into direct current, in addition to the three-phase inverter and the control circuit. Moreover, although the transmitting mechanism 45 of the above-described embodiment includes an eccentric shaft 451, a drive (ball) bearing 456, and an oscillating arm (fork) 458, the mechanism for converting the rotational output of the output shaft 413 into pivotal oscillating motion of the spindle 40 is not particularly limited and may be modified without departing from the scope of the present teachings. For example, the drive bearing 456 need not be a ball bearing and may be another type of bearing, such as, e.g., a needle bearing or spherical bearing. The oscillating arm 458 need not be bifurcated; it may have a single arm or an annular portion that encircles the drive bearing 456.

Further, in view of the nature of the present disclosure, the above-described embodiment and the modifications thereof, the following Aspects 1 to 4 are provided. At least one of the Aspects 1 to 4 can be employed alone or in combination with any one of the oscillating multi-tool 1 of the above-described embodiment, the above-described modifications and the claimed features.

(Aspect 1)

The housing part houses the spindle, the motor and the transmitting mechanism, and
 the motor is disposed within the housing part behind the spindle in the front-rear direction.

(Aspect 2)

The power tool, further comprising:
 a clamp shaft removably inserted in the spindle; and
 a biasing member disposed within the housing part and configured to bias the clamp shaft upward so as to impart a clamping force to the clamp shaft,
wherein:
 the plastic housing includes a cover part arranged to cover a top of the housing part and to receive an upward biasing force when the clamping force of the biasing member is released,
 the at least one first engagement part is provided to (on) the housing part,
 the at least one second engagement part is provided to (on) the cover part, and
 the at least one first engagement part and the at least one second engagement are configured to restrict relative movement of the first and second inner housing portions in the up-down direction.

The clamp shaft 61, the clamp spring 65 and the cover part 34 are examples of the "clamp shaft", the "biasing member" and the "cover part", respectively.

(Aspect 3)

The inner housing includes a rear part connected to the extending part and disposed within the rear part of the outer housing, and
 the rear part of the inner housing is a portion of the second housing.

(Aspect 4)

The inner housing includes an elastic connection part that elastically connects the extending part and the rear part of the inner housing, and the elastic connection part is a portion, e.g., an integral portion, of the second housing.

The following Aspects 5 to 18 are described with the aim of providing techniques for facilitating assembly of a power tool that is configured to drive (pivot) a tool accessory in an oscillating manner. Each one of the following Aspects 5 to 18 may be employed individually or in combination with any one or more of the other aspects. Alternatively, at least one of the following Aspects 5 to 18 may be employed in combination with at least one of the oscillating multi-tool 1 of the above-described embodiment, the above-described modifications and aspects, and the claimed features.

(Aspect 5)

A power tool configured to drive a tool accessory in an oscillating manner, the power tool comprising:
- an outer housing that is a hollow body (e.g., tubular structure) having a longitudinal axis that defines a front-rear direction of the power tool, the outer housing including a front part, a rear part and a grip part, the grip part connecting the front part and the rear part and being configured to be held by a user;
- an inner housing extending in the front-rear direction within the outer housing and elastically connected to the outer housing, the inner housing including a front part disposed within the front part of the outer housing, a rear part disposed within the rear part of the outer housing and an extending part extending rearward from the front part of the inner housing within the grip part of the outer housing;
- a spindle housed in the front part of the inner housing and configured to be driven in rotary (pivotal) oscillating motion within a specified angle range around a first axis that defines a up-down direction of the power tool, the spindle having a lower end portion configured to removably receive (support, contact, clamp) the tool accessory;
- a control device housed in the rear part of the inner housing and configured to control operation of the power tool, and
- a holder disposed in the extending part of the inner housing and configured to hold an electric wire that extends from the control device.

In the power tool of Aspect 5, the control device is housed in the rear part of the elongate inner housing, and the electric wire extends from the control device. The holder disposed in the extending part of the inner housing can hold the electric wire, which is easily deformable and displaceable, in position when the power tool is being assembled. Such a structure can facilitate assembly of the power tool.

(Aspect 6)

The power tool as defined in Aspect 5, wherein the holder is formed separately from the inner housing and is housed within the extending part.

According to Aspect 6, an assembler can easily house (install) the electric wire within the inner housing by housing (placing) the holder having the electric wire held therein within the inner housing.

(Aspect 7)

The power tool as defined in Aspect 6, wherein:
- the holder has a passage extending through the holder in the front-rear direction, and
- the holder is formed by a body and a cover being connected to each other.

According to Aspect 7, laying (installing) the electric wire and assembling the holder can both be facilitated.

(Aspect 8)

The power tool as defined in any one of Aspects 5 to 7, further comprising:
- a weight (counterweight, supplemental weight) provided to (at) the extending part of the inner housing,
- wherein the holder is located below the weight.

According to Aspect 8, the moment of inertia of the inner housing can be effectively increased by providing the weight, which can reduce unnecessary movement of the inner housing relative to the outer housing and thus deterioration in working efficiency of the tool accessory. Further, the weight can be rationally arranged by effectively utilizing the limited amount of space within the extending part.

(Aspect 9)

The power tool as defined in Aspect 8, wherein the holder and the weight are configured to be partially engaged with each other.

According to Aspect 9, the holder and the weight can be temporarily fixed to each other while the inner housing is being assembled, so that the assembling is further facilitated.

(Aspect 10)

The power tool as defined in any one of Aspects 5 to 9, wherein:
- the inner housing is formed by a first inner housing portion connected to a second inner housing portion,
- the first inner housing portion includes:
  - a housing part that houses at least the spindle and that forms at least a portion of the front part of the inner housing; and
  - a first extending part that extends rearward from the housing part and that forms a portion of the extending part,
- the second inner housing portion includes a second extending part that forms a portion of the extending part,
- a direction that is orthogonal to the up-down direction and to the front-rear direction is defined as a left-right direction of the power tool,
- the second inner housing portion is formed by a left member and a right member being connected together in the left-right direction, and
- the first extending part is held between the left member and the right member.

According to Aspect 10, the components of the inner housing can be reliably connected to form the entire inner housing, while further facilitating the assembly work.

(Aspect 11)

The power tool as defined in Aspect 10, wherein the first inner housing portion and the holder are configured to be partially engaged with each other.

According to Aspect 11, the holder and the first inner housing portion can be temporarily fixed to each other while the inner housing is being assembled, so that the assembly work is further facilitated.

(Aspect 12)

The power tool as defined in Aspect 10 or 11, further comprising:
- a weight (counterweight, supplemental weight) provided at the extending part of the inner housing,
- wherein the weight is held between the left member and the right member.

According to Aspect 12, the weight can be reliably connected and can be easily assembled to the extending part.

(Aspect 13)

The power tool as defined in any one of Aspects 10 to 12, wherein the first inner housing portion is formed of metal.

According to Aspect 13, the first extending part can function like a reinforcing rod (support beam, core rod) for the extending part and thereby reduce the possibility that the extending part acts like a spring element (e.g., in a high temperature and/or high humidity environment) which would detrimentally reduce the vibration isolating effect.
(Aspect 14)

The power tool as defined in Aspect 13, wherein the left member and the right member of the second inner housing portion are formed of synthetic resin (polymer).

According to Aspect 14, the number of metal components forming the inner housing can be reduced, so that the weight of the inner housing can be reduced.
(Aspect 15)

The power tool further includes a motor that is housed in the front part of the inner housing and that has at least one terminal for power supply, and the electric wire is connected to the at least one terminal.
(Aspect 16)

The holder is formed as an elongate cylindrical body extending in the front-rear direction along the extending part.
(Aspect 17)

The second extending part has a tubular shape, and the holder is housed within the second extending part.
(Aspect 18)

The body includes:

a peripheral wall that defines the passage; and an opening that is provided in the peripheral wall and that extends over an entire length of the opening, and the cover is connected to the body to cover the opening.

Correspondences between the features of the above-described embodiment and the features of the Aspects 5 to 18 are as follows. The features of the above-described embodiment are merely exemplary and do not limit the features of the present disclosure or the present invention.

The oscillating multi-tool 1 is an example of the "power tool". The tool accessory 91 is an example of the "tool accessory". The outer housing 2, the front part 21, the rear part 23, the grip part (intermediate part) 22 are examples of the "outer housing", the "front part of the outer housing", the "rear part of the outer housing", the "grip part", respectively. The inner housing 3, the front part 30, the rear part 39, the extending part 35 are examples of the "inner housing", the "front part of the inner housing", the "rear part of the inner housing", the "extending part", respectively. The spindle 40 is an example of the "spindle". The driving axis A1 is an example of the "first axis". The control unit 395 (specifically, the control circuit) is an example of the "control device". The wire holder 5 is an example of the "holder". The electric wire 419 is an example of the "electric wire". The body 51 and the cover 56 are examples of the "body" and the "cover", respectively. The passage 50 is an example of the "passage".

The weight 351 is an example of the "weight", "counterweight" or "supplemental weight". The metal housing 301 and the plastic housing 305 are examples of the "first housing portion" and the "second housing portion", respectively. The housing part 302, the inner extending part 37, the outer extending part 36 are examples of the "housing part", the "first extending part", the "second extending part", respectively. The left shell 307 and the right shell 306 are examples of the "left member" and the "right member", respectively. The motor 41 is an example of the "motor".

The power tool as defined in Aspects 5 to 18 is not limited to the oscillating multi-tool 1 of the above-described embodiment. For example, the following modifications may be made. At least one of these modifications may be adopted in combination with at least one of the oscillating multi-tool 1 of the above-described embodiment, the above-described modifications and aspects, and the claimed features.

The shapes and components of the metal housing 301 and the plastic housing 302 that form the inner housing 3 and the manner of connecting the metal housing 301 and the plastic housing 302 may be appropriately changed. For example, the metal housing 301 may correspond only to the front part 301. Specifically, the metal housing 301 may include the housing part 302 only, without including the inner extending part 37. In such an embodiment, the extending part 35 may be formed by a portion (the outer extending part 36, for example) of the plastic housing 305.

The structure of the wire holder 5 may be appropriately changed, in accordance with or regardless of any change in the extending part 35. The electric wire(s) held by the wire holder 5 is (are) not limited to the electric wire(s) connected to the motor 41. For example, the electric wire(s) held by the wire holder 5 may be connected to one or more other electrical component(s) (e.g. a sensor) that is (are) disposed within the front part 30 or in the extending part 35.

In the above-described embodiment, the length of the wire holder 5 is about the same as that of the extending part 35, but the length of the wire holder 5 may be shorter than that of the extending part 35. The shape, size of the body 51 and the cover 56, and the manner of connecting the body 51 and the cover 56 may be appropriately changed. For example, the cover 56 may only partially cover the opening 53, as long as the cover 56 is capable of restricting movement of the electric wires 419 such that the electric wires 419 do not come out of the passage 50. Alternatively, the cover 56 may be omitted, and the body 51 may instead have one or more restricting ribs, for example, which is (are) capable of holding (retaining) the electric wires 419 in position. Thus, the wire holder 5 may be formed as a single (integral) member. Further, the structures for engaging the wire holder 5 and the inner extending part 37 and/or the wire holder 5 and the weight 351 are not limited to those described above, or may be omitted.

Further, the position of the wire holder 5 relative to the extending part 35 may be appropriately changed, in accordance with or regardless of any change in the extending part 35. For example, the wire holder 5 may be disposed under the inner extending part 37 or on the left or right side of the inner extending part 37. Further, the wire holder 5 may be fixed on an outer surface of the extending part 35, or may be formed integrally with the extending part 35 inside the extending part 35.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved oscillating multi-tools.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

DESCRIPTION OF THE REFERENCE NUMERALS

1: oscillating multi-tool, 10: housing, 11: elastic member, 13: elastic member, 15: elastic member, 2: outer housing, 20: switch holder, 21: front part, 215: projection, 22: intermediate part (grip part), 23: rear part, 26: holding member, 260: light unit, 262: rear end part, 263: support leg, 265: arm, 269: electric wire, 27: upper shell, 28: lower shell, 29: switch, 291: actuation part, 293: switching member, 294: operation part, 3: inner housing, 301: metal housing, 302: housing part, 305: plastic housing, 306: right shell, 307: left shell, 30: front part, 31: first housing part, 311: protruding part, 312: engagement groove, 314: recess, 32: second housing part, 33: third housing part, 331: recess, 34: cover part, 341: projection, 342: cylindrical part, 343: recess, 35: extending part, 351: weight, 352: front portion, 353: rear portion, 354: projection, 355: through hole, 36: outer extending part, 361: cylindrical part, 362: cylindrical part, 364: cylindrical part, 365: cylindrical part, 37: inner extending part, 371: recess, 372: engagement groove, 374: through hole, 38: elastic connection part, 381: elastic rib, 39: rear part, 391: battery mounting part, 392: control-unit housing part, 393: arm, 395: control unit, 40: spindle, 401: tool mounting part, 41: motor, 410: stator assembly, 411: stator, 413: output shaft, 415: board, 417: terminal block, 419: electric wire, 42: fan, 45: transmitting mechanism, 451: eccentric shaft, 454: eccentric part, 456: drive bearing, 458: oscillating arm, 5: wire holder, 50: passage, 51: body, 52: peripheral wall, 521: bottom wall, 523: side wall, 524: projection, 53: opening, 56: cover, 561: upper wall, 563: side wall, 564: engagement hole, 565: protruding part, 566: projection piece, 567: projection piece, 568: protruding part, 60: clamping mechanism, 61: clamp shaft, 615: clamp head, 65: clamp spring, 7: lock mechanism, 71: clamp member, 73: holder, 75: collar, 77: lever, 772: engagement part, 776: inner flange, 78: rotary shaft, 781: eccentric part, 91: tool accessory, 93: battery, A1: driving axis, A2: rotational axis, A3: rotational axis

What is claimed is:

1. A power tool configured to drive a tool accessory in an oscillating manner, the power tool comprising:
an outer housing that is a hollow body having a longitudinal axis that defines a front-rear direction of the power tool, the outer housing including a front part, a rear part and a grip part, the grip part connecting the front part and the rear part and being configured to be held by a user;
an inner housing extending in the front-rear direction within the outer housing and elastically connected to the outer housing, the inner housing including a front part disposed within the front part of the outer housing, a rear part disposed within the rear part of the outer housing and an extending part extending rearward from the front part of the inner housing within the grip part of the outer housing;
a spindle housed in the front part of the inner housing and configured to be driven in rotary oscillating motion within a specified angle range around a first axis that defines an up-down direction of the power tool, the spindle having a lower end portion configured to removably receive the tool accessory;
a control device housed in the rear part of the inner housing and configured to control operation of the power tool;
a holder disposed in and directly connected to the extending part of the inner housing and holding an electric wire that extends from the control device; and
a weight held on the extending part of the inner housing and directly engaging the holder,
wherein:
the holder is located between the extending part and the weight in the up-down direction,
the weight increases the moment of inertia of the inner housing with respect to the first axis;
the holder includes a protrusion that extends upward from an upper surface of the holder in the up-down direction at a location that is in-between front and rear ends of the holder in the front-rear direction, and
the weight has a projection that engages in the protrusion of the holder.

2. The power tool as defined in claim 1, wherein the holder is formed separately from the inner housing and is housed within the extending part.

3. The power tool as defined in claim 1, wherein:
the holder has a passage extending through the holder in the front-rear direction, and
the holder is formed by a body and a cover being connected to each other.

4. The power tool as defined in claim 3, wherein:
the holder is located below the weight in the up-down direction, and
the protrusion is located on the cover of the holder.

5. The power tool as defined in claim 1, wherein:
the inner housing is formed by a first inner housing portion connected to a second inner housing portion,
the first inner housing portion includes:
a housing part that houses at least the spindle and that forms at least a portion of the front part of the inner housing; and
a first extending part that extends rearward from the housing part and that forms a portion of the extending part,
the second inner housing portion includes a second extending part that forms a portion of the extending part,
a direction that is orthogonal to the up-down direction and to the front-rear direction is defined as a left-right direction of the power tool,
the second inner housing portion is formed by a left member and a right member being connected together in the left-right direction, and
the first extending part is held between the left member and the right member.

6. The power tool as defined in claim 5, wherein the first inner housing portion and the holder are configured to be partially engaged with each other.

7. The power tool as defined in claim 6, wherein:
the second extending part has a tubular shape,
the holder is formed as an elongate tubular body that extends in the front-rear direction above the first extending part of the first inner housing portion within the second extending part.

8. The power tool as defined in claim 7, wherein:
the holder is located below the weight in the up-down direction, and
the protrusion is located on the cover of the holder.

9. The power tool as defined in claim 8, wherein the weight is held between the left member and the right member.

10. The power tool as defined in claim 9, wherein:
the first inner housing portion is formed of metal, and
the left member and the right member of the second inner housing portion are formed of synthetic resin.

11. The power tool as defined in claim 9, wherein the weight is held between the left member and the right member.

12. The power tool as defined in claim 9, wherein the first inner housing portion is formed of metal.

13. The power tool as defined in claim 12, wherein the left member and the right member of the second inner housing portion are formed of synthetic resin.

14. The power tool as defined in claim 1, wherein the protrusion is located on a cover of the holder.

15. The power tool as defined in claim 14, wherein:
the holder has a passage extending through the holder in the front-rear direction, and
the protrusion of the holder is disposed entirely outside of the passage.

16. The power tool as defined in claim 15, wherein the holder includes a projection piece that projects from a side surface of the holder and directly engages the extending part.

17. The power tool as defined in claim 1, wherein the holder is fitted in a recess defined in lower surface of the extending part and extending in the up-down direction.

18. A power tool configured to drive a tool accessory in an oscillating manner, the power tool comprising:
an outer housing that is a hollow body having a longitudinal axis that defines a front-rear direction of the power tool, the outer housing including a front part, a rear part and a grip part, the grip part connecting the front part and the rear part and being configured to be held by a user;
an inner housing extending in the front-rear direction within the outer housing and elastically connected to the outer housing, the inner housing including a front part disposed within the front part of the outer housing, a rear part disposed within the rear part of the outer housing and an extending part extending rearward from the front part of the inner housing within the grip part of the outer housing;
a spindle housed in the front part of the inner housing and configured to be driven in rotary oscillating motion within a specified angle range around a first axis that defines an up-down direction of the power tool, the spindle having a lower end portion configured to removably receive the tool accessory;
a control device housed in the rear part of the inner housing and configured to control operation of the power tool;
a holder disposed in the extending part of the inner housing and holding an electric wire that extends from the control device; and
a weight provided at the extending part of the inner housing;
wherein:
the holder is located below the weight,
the holder has a passage extending through the holder in the front-rear direction,
the holder comprises a cover connected to a body,
the body of the holder has an elongate channel shape that extends in the front-rear direction along the extending part,
the body of the holder includes (i) a peripheral wall that defines the passage, and (ii) an opening that is provided in the peripheral wall and that extends over an entire length of the body,
the cover is connected to the body to cover the opening,
the extending part is integral with the front part of the inner housing such that there are no seams between the extending part and the front part of the inner housing;
the holder includes a protrusion that extends upward from an upper surface of the holder in the up-down direction at a location that is in-between front and rear ends of the holder in the front-rear direction, and
the weight has a projection that engages in the protrusion of the holder.

19. The power tool as defined in claim 18, wherein the extending part extends rearward of a center of the grip part of the outer housing along the front-rear direction.

20. The power tool as defined in claim 18, wherein:
the protrusion is located on the cover of the holder, and
the weight increases the moment of inertia of the inner housing with respect to the first axis.

* * * * *

UNITED STATES PATENT AND TRADEMARK OFFICE
CERTIFICATE OF CORRECTION

PATENT NO. : 12,290,867 B2
APPLICATION NO. : 18/101245
DATED : May 6, 2025
INVENTOR(S) : Yonosuke Aoki It is certified that error appears in the above-identified patent and that said Letters Patent is hereby corrected as shown below:

In the Claims

In Claim 11, at Column 31, Line 18, replace "claim 9" with "claim 5".

In Claim 12, at Column 31, Line 21, replace "claim 9" with "claim 5".

Signed and Sealed this
Twenty-fifth Day of November, 2025

John A. Squires
*Director of the United States Patent and Trademark Office*